United States Patent
Hashemi

(10) Patent No.: US 10,869,256 B2
(45) Date of Patent: Dec. 15, 2020

(54) MULTI-HOP ROUTING PROTOCOL WITH BACKUP ROUTES IN WLAN NETWORKS

(71) Applicant: SONY CORPORATION, Tokyo (JP)

(72) Inventor: Morteza Hashemi, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 73 days.

(21) Appl. No.: 16/224,405

(22) Filed: Dec. 18, 2018

(65) Prior Publication Data

US 2020/0196219 A1   Jun. 18, 2020

(51) Int. Cl.
*H04W 40/20* (2009.01)
*H04L 12/733* (2013.01)
*H04L 12/721* (2013.01)
*H04W 40/06* (2009.01)
*H04W 40/12* (2009.01)
*H04W 40/24* (2009.01)

(52) U.S. Cl.
CPC ........... *H04W 40/20* (2013.01); *H04L 45/122* (2013.01); *H04L 45/26* (2013.01); *H04W 40/06* (2013.01); *H04W 40/12* (2013.01); *H04W 40/246* (2013.01)

(58) Field of Classification Search
CPC ... H04W 40/20; H04W 40/06; H04W 40/246; H04W 40/12; H04W 40/16; H04W 40/28; H04L 45/122; H04L 45/26
See application file for complete search history.

(56) References Cited

U.S. PATENT DOCUMENTS

| 10,116,367 B1* | 10/2018 | Sakoda | H04B 7/061 |
| 2006/0067283 A1* | 3/2006 | So | H04W 72/044 370/338 |
| 2008/0037477 A1* | 2/2008 | Axelsson | H04L 45/02 370/338 |

(Continued)

OTHER PUBLICATIONS

ISA/European Patent Office, International Search Report and Written Opinion dated Nov. 26, 2019, related PCT international application No. PCT/IB2019/057833, pp. 1-9, claims searched, pp. 10-16.

(Continued)

*Primary Examiner* — Pao Sinkantarakorn
*Assistant Examiner* — Kabir U Jahangir
(74) *Attorney, Agent, or Firm* — O'Banion & Ritchey LLP; John P. O'Banion

(57) ABSTRACT

A wireless communication apparatus, system or method utilizing for performing data transmission over a communication band (e.g., directional mmW) which maintains a primary and at least one backup route for communications between a source and destination station. Route discovery messages are sent to neighboring stations in creating a route over multiple hops. Along the routing path link metrics are determined which are shared with other stations. Route discovery and routing response messages are propagated to neighbor stations aside from the sending station. The destination station, upon receiving the route discovery message, determines a primary route and at least one backup route, and sends this information in a route reply message back to the originator of the route discovery message. Stations maintain these primary and backup routes through status request and status reply messages.

21 Claims, 27 Drawing Sheets

(56) References Cited

U.S. PATENT DOCUMENTS

2009/0168653 A1\* 7/2009 St. Pierre .............. H04W 40/28
  370/238
2018/0020389 A1\* 1/2018 Abdallah ............ H04W 40/246

OTHER PUBLICATIONS

Park, Jiwon et al., "A Multipath AODV Routing Protocol in Mobile Ad Hoc Networks with SINR-Based Route Selection", IEEE ISWCS 2008, Oct. 21, 2008, conference paper, pp. 682-686.

\* cited by examiner

| Element ID | Length | Active Path Selection Protocol Identifier | Active Path Selection Metric Identifier | Congestion Control Mode Identifier | Synchronization Method Identifier | Authentication Protocol Identifier | Mesh Formation Info | Mesh Capability |
|---|---|---|---|---|---|---|---|---|
| 1 | 1 | 1 | 1 | 1 | 1 | 1 | 1 | 1 |

Octets:

FIG. 4
(Prior Art)

| Frame control | Duration | RA | TA | SSW | SSW Feedback | FCS |
|---|---|---|---|---|---|---|
| 2 | 2 | 6 | 6 | 3 | 3 | 4 |

Octets:

**FIG. 7
(Prior Art)**

| B0 | B1  B9 | B10  B15 | B16  B17 | B18  B23 |
|---|---|---|---|---|
| Direction | CDOWN | Sector ID | DMG Antenna ID | RXSS Length |
| 1 | 9 | 6 | 2 | 6 |

Bits:

**FIG. 8
(Prior Art)**

| B0  B8 | B9  B10 | B11  B15 | B16 | B17  B23 |
|---|---|---|---|---|
| Total sectors in ISS | Number of RX DMG antennas | Reserved | Poll Required | Reserved |
| 9 | 2 | 5 | 1 | 7 |

Bits:

**FIG. 9A
(Prior Art)**

| B0  B5 | B6  B7 | B8  B15 | B16 | B17  B23 |
|---|---|---|---|---|
| Sector select | DMG Antenna select | SNR report | Poll Required | Reserved |
| 6 | 2 | 8 | 1 | 7 |

Bits:

**FIG. 9B
(Prior Art)**

MULTI-HOP ROUTING PROTOCOL WITH BACKUP ROUTES IN WLAN NETWORKS

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document may be subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND

1. Technical Field

The technology of this disclosure pertains generally to wireless network communications, and more particularly to the multiple-hop routing over primary and backup routes.

2. Background Discussion

The need for faster and more robust wireless network communication is becoming increasingly important. In response to the need of reaching these higher capacities, network operators have begun to embrace various concepts to achieve densification. Current sub-6 GHz wireless technology is not sufficient to cope with high data demands. One alternative is to utilize additional spectrum in the 30-300 GHz band which is often referred to as the millimeter wave band (mmW).

To efficiently utilize mmW wireless networking systems generally requires properly dealing with channel impairments and propagation characteristics of these high frequency bands. High free-space path loss, high penetration, reflection and diffraction losses reduce available diversity and limit non-line-of-sight (NLOS) communications. Yet, the small wavelength of mmW enables the use of high-gain electronically steerable directional antennas of practical dimensions, which can provide sufficient array gain to overcome path loss and ensure a high Signal-to-Noise Ratio (SNR) at the receiver. Directional distribution networks (DNs) in dense deployment environments using mmW bands could be an efficient way for achieving reliable communications between stations (STAs) and overcoming line-of-sight channel restrictions.

When a new station (STA or node) is starting up it will be looking (searching) for neighboring STAs to discover in a network to be joined. The process of initial access of a STA to a network comprises scanning for neighboring STAs and discovering all active STAs in the local vicinity. This can be performed either through the new STA searching for a specific network or list of networks to join, or by the new STA sending a broadcast request to join any already established network that will accept the new STA.

A STA connecting to a distributed network (DN) needs to discover neighboring STAs to decide on the best way to reach a gateway/portal DN STAs and the capabilities of each of these neighboring STAs. The new STA examines every channel for possible neighboring STAs over a specific period of time. If no active STA is detected after that specific time, the new STA moves to test the next channel. When a STA is detected, the new STA collects sufficient information to configure its physical (PHY) layer (e.g., OSI model) for operation in the regulatory domain (IEEE, FCC, ETSI, MKK, etc.). This task is further challenging in mmW communications due to directional transmissions. The challenges in this process can be summarized as: (a) knowledge of surrounding STAs IDs; (b) knowledge of the best transmission pattern(s) for beamforming; (c) channel access issues due to collisions and deafness; and (d) channel impairments due to blockage and reflections. Designing a neighborhood discovery method to overcome some or all of the above is of utmost importance to enable pervasiveness of mmW D2D and DN technologies.

Most existing technologies for DN address discovery for networks operating in broadcast mode are not targeted to networks with directional wireless communications. In addition, those technologies which utilize directional wireless network communications often have very high overhead demands in regards to the generation of beacon signals. Still further these technologies lack sufficient mechanisms for reducing the overhead and latencies involved with performing discovery.

Current mmW communication systems rely on directional communications to gain sufficient link budget between the transmitter (Tx) and the receiver (Rx). For a station to access the channel it first listens to check if the medium is either occupied or free. The listening phase is usually performed using a quasi-Omni antenna, and in many instances this results in channel access being blocked although the transmission or reception direction is not affected by actual directional signal.

The task of establishing a multi-hop communication network in mmWave band is much more challenging due to directionality, compared with Omni-directional communications in low frequency band systems. The challenges in this process can be summarized as: (a) knowledge of surrounding nodes IDs; (b) knowledge of best transmission patterns for beamforming to neighbors; (c) channel access issues arising due to collisions and deafness; and (c) channel impairments due to blockage and reflections.

Existing technologies often fail in regard to their use of directional mmW communications, or in recovering in response to blockage and other channel impairments.

Accordingly, a need exists for enhanced mechanisms for efficiently utilizing directional mmW communications and providing rapid recovery from blockage and impairments. The present disclosure fulfills these needs and provides additional benefits over previous technologies.

BRIEF SUMMARY

Wireless networking is susceptible to various channel impairments, including human blockage. It is important in many applications to be able to quickly detect and replace blocked links to avoid any interruption in data delivery. The present disclosure describes a wireless multi-hop protocol which efficiently discovers and tracks multiple next-hop options (one primary and one to several backup routes) to reach to the destination STA. In this case, if the link to the primary next-hop is blocked, other alterative next-hops can quickly be deployed, thus avoiding any interruption or delay in order to find an alternative link. This disclosure is applicable to various networks, and not limited to millimeter wave directional networking.

Current multi-hop routing protocols do not consider discovering and keeping track of multiple next-hop options when they set up routing protocols at the STAs. As a result, the current wireless protocols incur high delay and re-discovery overhead in instances in which the primary route is blocked. In contrast to this, the present disclosure discovers next-hop options and maintains them so that they are ready to be deployed at any time without any additional setup overhead under a blockage scenario.

To achieve the above objectives a new message flooding mechanism is taught for route request (RREQ) and route reply (RREP) messages in order to discover several routes between the originating STA and destination STA. In addition, STAs deploy a forwarding table to minimize the flooding overhead. Finally, using status request (SREQ) and status reply (SREP) messages, STAs proactively assure that their routing table entries (primary and backups) are up-to-date and multiple next-hop options are reachable and ready to be deployed at any time.

The teachings of the present disclosure can be applied to wireless LAN (WLAN), wireless personal area networks (WPAN), device-to-device (D2D), peer-to-peer (P2P), mesh networks, and outdoor wireless communications. Thus, the disclosed technology can be utilized in a wide range of target applications, the following being provided by way of example and not limitation: Wi-Fi, WiGig, Wi-Fi type networks, Internet of things (IoT) applications, backhauling and fronthaul of data, indoor and outdoor distribution networks, mesh networks, next generation cellular networks with D2D communications, and so forth.

Further aspects of the technology described herein will be brought out in the following portions of the specification, wherein the detailed description is for the purpose of fully disclosing preferred embodiments of the technology without placing limitations thereon.

BRIEF DESCRIPTION OF THE SEVERAL VIEWS OF THE DRAWING(S)

The technology described herein will be more fully understood by reference to the following drawings which are for illustrative purposes only:

FIG. 4 is a data field diagram depicting a DN configuration element for an IEEE 802.11 WLAN.

FIG. 7 is a data field diagram depicting a sector sweep (SSW) frame element for IEEE 802.11ad.

FIG. 8 is a data field diagram depicting the SSW field within the SSW frame element for IEEE 802.11ad.

FIG. 9A and FIG. 9B are data field diagrams depicting SSW feedback fields shown when transmitted as part of an ISS in FIG. 9A, and when not transmitted as part of an ISS in FIG. 9B, as utilized for IEEE 802.11ad.

DETAILED DESCRIPTION

Figure 1:
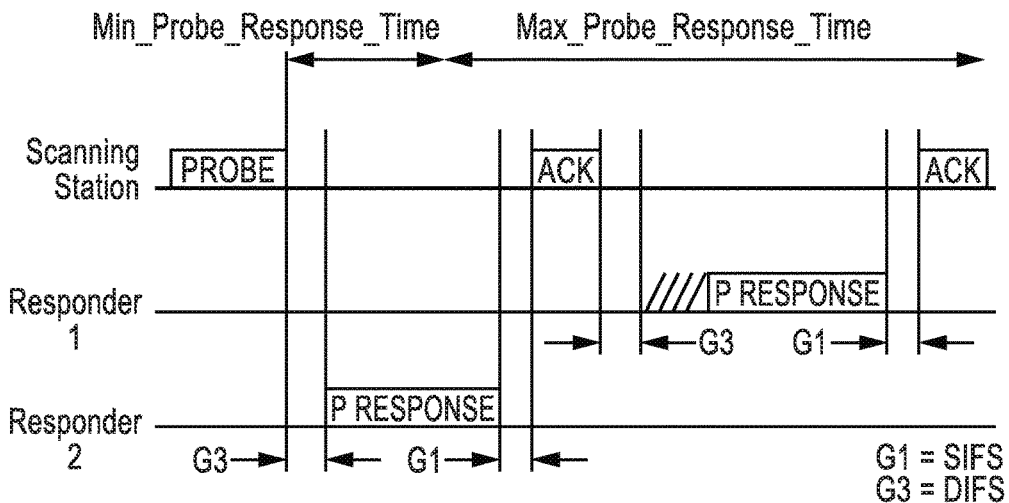
FIG. 1 is a timing diagram of active scanning performed in an IEEE 802.11 wireless local area network (WLAN).

When used in this disclosure the following terms have the meanings generally described below.

AP: Access Point; an entity that contains one station (STA) and provides access to the distribution services, through the wireless medium (WM) for associated STAs.

AODV: Ad-hoc On-Demand Distance Vector (AODV) is a routing protocol designed for wireless and mobile ad-hoc networks for establishing on-demand routes to destinations.

Beamforming (BF): a directional transmission from a directional antenna system or array, and not an Omni-directional or quasi-Omni antenna, for determining information for improving received signal power or signal-to-noise ratio (SNR) at the intended receiver, and under which stations can obtain information for correlating time and directional allocation information.

BI: the Beacon Interval is a cyclic super frame period that represents the time between beacon transmission times.

BRP: BF Refinement protocol is a BF protocol that enables receiver training and iteratively trains transmitter and receiver sides to optimize (achieve the best possible) directional communications.

BSS: Basic Service Set, is a set of stations (STAs) that have successfully synchronized with an AP in the network. A component of the IEEE 802.11 WLAN architecture, built around a BSS which is actually a set of STAs connecting to the wireless medium allowing the STAs to communicate with each other.

BTI: Beacon Transmission Interval, is the interval between successive beacon transmissions.

CBAP: Contention-Based Access Period is the time period within the data transfer interval (DTI) of a directional multi-gigabit (DMG) BSS where contention-based enhanced distributed channel access (EDCA) is utilized.

CSMA/CA: is Carrier-Sense Multiple Access with Collision Avoidance is a network multiple access method in which carrier sensing is utilized.

DMG: Directional Multi-Gigabit are a form of high throughput wireless communications described in IEEE 802.

DN STA: distributed network (DN) station (DN STA) is a station (STA) that implements the DN facility. A DN STA that operates in the DN BSS may provide the distribution services for other DN STAs.

DTI: Data Transfer Interval is the period in which full BF training is permitted followed by actual data transfer. The DTI can include one or more service periods (SPs) and contention-based access periods (CBAPs).

FCS: is a Frame Check Sequence providing error-detecting code added to a frame in a communications protocol.

LOS: Line-of-Sight, a communication in which the transmitter and receiver are ostensibly within sight of one another, and not the result of communication of a reflected signal. The opposite condition is NLOS for non-line-of-sight, wherein stations are not in LOS with one another.

MAC address: a Medium Access Control (MAC) address.

MBSS: Mesh Basic Service Set is a basic service set (BSS) that forms a self-contained network of distributed network (DN) Stations (DN STAs) which may be used as a distribution system (DS).

Omni-directional: a mode of transmission utilizing a non-directional antenna.

Quasi-Omni directional: is a mode of communication utilizing a directional multi-gigabit (DMG) antenna with the widest beamwidth attainable.

NAV information: is information for a virtual carrier-sensing mechanism used with wireless network protocols, such as IEEE 802.11.

RA: is the Recipient Address to which data is to be communicated.

RREP: Routing Reply; a message frame that is generated by the destination STA and contains information about the originating STA.

RREQ: Routing request; a message frame that is generated by the originating STA and contains information about the destination STA.

Receive sector sweep (RXSS): Reception of Sector Sweep (SSW) frames via (across) different sectors, in which a sweep is performed between consecutive receptions.

RSSI: receive signal strength indicator (in dBm).

SLS: Sector-level Sweep phase is a BF training phase that can include as many as four components: an Initiator Sector Sweep (ISS) to train the initiator, a Responder Sector Sweep (RSS) to train the responder link, such as using SSW Feedback and an SSW ACK.

SNR: received Signal-to-Noise Ratio in dB.

SP: Service Period is the time period that is scheduled by the access point (AP), with scheduled SPs starting at fixed intervals of time.

Spectral efficiency: the information rate that can be transmitted over a given bandwidth in a specific communication system, usually expressed in bits per second, or in Hertz.

SREQ: Status Request; a message frame that is generated by each STA and is used to check if the next-hop STAs are alive and the routing table entries are valid. SREQ is also used to update the link metric.

SREP: Status Reply; a message frame that is generated in response to the status request (SREQ) message.

SSID: service Set Identifier is the name assigned to a WLAN network.

STA: Station (or node) is a logical entity that is a singly addressable instance of a medium access control (MAC) and physical layer (PHY) interface to the wireless medium (WM).

Sweep: a sequence of transmissions, separated by a short beamforming interframe space (SBIFS) interval, in which the antenna configuration at the transmitter or receiver is changed between transmissions.

SSW: Sector Sweep, is an operation in which transmissions are performed in different sectors (directions) and information collected on received signals, strengths and so forth.

TDD: Time Division Duplex allows the communication link to be duplexed, in which uplink is separated from downlink by the allocation of different time slots in the same frequency band, to adjust for different uplink and downlink data transmission flows.

TDD SP: Time Division Duplexing Service Period is a service period with TDD channel access, in which the TDD SP comprises a sequence of TDD intervals that, in turn, comprise a sequence of TDD slots.

Transmit Sector Sweep (TXSS): is transmission of multiple Sector

Sweep (SSW) or Directional Multi-gigabit (DMG) Beacon frames via different sectors, in which a sweep is performed between consecutive transmissions.

1. Existing Directional Wireless Network Technology

1.1. WLAN Systems

In WLAN systems, such as 802.11, there are defined two modes of scanning; passive and active scanning. The following are the characteristics of passive scanning. (a) A new station (STA) attempting to join a network, examines each channel and waits for beacon frames for up to MaxChannelTime. (b) If no beacon is received, then the new STA moves to another channel, thus saving battery power since the new STA does not transmit any signal in scanning mode. The STA should wait enough time at each channel so that it does not miss the beacons. If a beacon is lost, the STA should wait for another beacon transmission interval (BTI).

The following are the characteristics of active scanning. (a) A new STA wanting to join a local network sends probe request frames on each channel, according to the following. (a)(1) The new STA moves to a channel, waits for incoming frames or a probe delay timer to expire. (a)(2) If no frame is detected after the timer expires, the channel is considered to not be in use. (a)(3) If a channel is not in use, the STA moves to a new channel. (a)(4) If a channel is in use, the STA gains access to the medium using regular DCF and sends a probe request frame. (a)(5) The STA waits for a desired period of time (e.g., Minimum Channel Time) to receive a response to the probe request if the channel was never busy. The STA waits for more time (e.g., Maximum Channel Time) if the channel was busy and a probe response was received.

(b) A Probe Request can use a unique service set identifier (SSID), list of SSIDs or a broadcast SSID. (c) Active scanning is prohibited in some frequency bands. (d) Active scanning can be a source of interference and collision, especially if many new STAs arrive at the same time and are attempting to access the network. (e) Active scanning is a faster way (less delay) for STAs to gain access to the network compared to the use of passive scanning, since STAs do not need to wait for beacons. (f) In the infrastructure basic service set (BSS) and IBSS, at least one STA is awake to receive and respond to probes. (g) STAs in a distributed network (DN) basic service set (MBSS) might not be awake at any point of time to respond. (h) When radio measurement campaigns are active, STAs might not answer the probe requests. (i) Collision of probe responses can arise. STAs might coordinate the transmission of probe responses by allowing the STA that transmitted the last beacon to transmit the first Probe Response. Other STAs can follow and use back-off times and regular distributed coordination function (DCF) channel access to avoid collision.

FIG. 1 depicts the use of active scanning in an IEEE 802.11 WLAN, depicting a scanning station sending a probe and two responding stations which receive and respond to the probe. The figure also shows the minimum and maximum probe response timing. The value G1 is shown set to SIFS which is the interframe spacing prior to transmission of an acknowledgment, while value G3 is DIFS which is DCF interframe spacing, represented the time delay for which a sender waits after completing a backoff period before sending an RTS package.

1.2. IEEE 802.11s Distributed Network (DN) WLAN

IEEE 802.11s (hereafter 802.11s) is a standard that adds wireless mesh networking capabilities to the 802.11 standard. In 802.11s new types of radio stations are defined as well as new signaling to enable mesh network discovery, establishing peer-to-peer connection, and routing of data through the mesh network.

Figure 2:
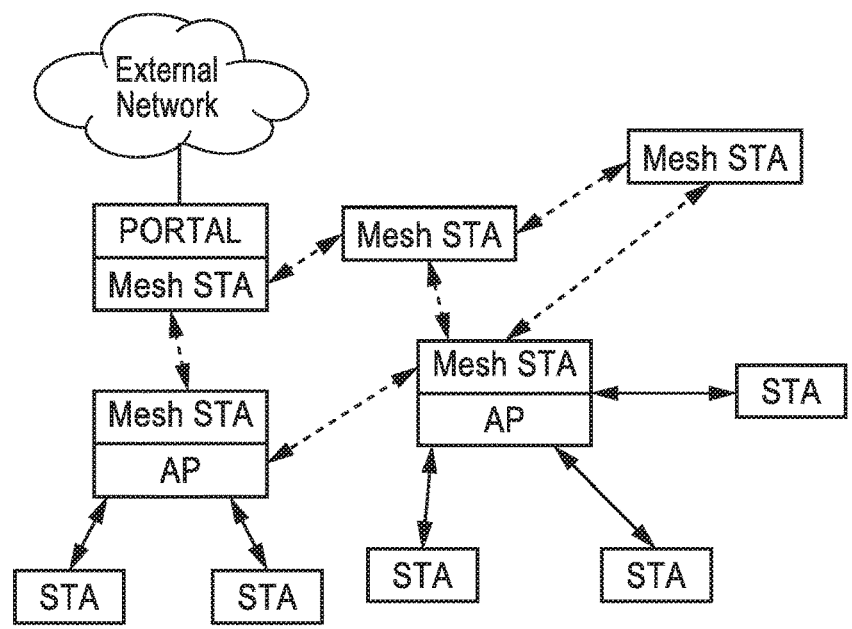
FIG. 2 is a station (STA) diagram for a Distributed Network (DN) showing a combination of DN and non-DN stations.

FIG. 2 illustrates one example of a mesh network where a mix of non-mesh STA connect to Mesh-STA/AP (solid lines) and Mesh STAs connect to other mesh STA (dotted lines) including a mesh portal. Nodes in mesh networks use the same scanning techniques defined in the 802.11 standard for discovering neighbors. The identification of the mesh network is given by the Mesh ID element contained in the Beacon and the Probe Response frames. In one mesh network, all mesh STAs use the same mesh profile. Mesh profiles are considered the same if all parameters in the mesh profiles match. The mesh profile is included in the Beacon and Probe Response frames, so that the mesh profile can be obtained by its neighbor mesh STAs through the scan.

When a mesh STA discovers a neighbor mesh STA through the scanning process, the discovered mesh STA is considered a candidate peer mesh STA. It may become a member of the mesh network, of which the discovered mesh STA is a member, and establish a mesh peering with the neighbor mesh STA. The discovered neighbor mesh STA may be considered a candidate peer mesh STA when the mesh STA uses the same mesh profile as the received Beacon or Probe Response frame indicates for the neighbor mesh STA.

The mesh STA attempts to maintain the discovered neighbor's information in a Mesh Neighbors Table which includes: (a) neighbor MAC address; (b) operating channel number; and (c) the most recently observed link status and quality information. If no neighbors are detected, the mesh STA adopts the Mesh ID for its highest priority profile and remains active. All the previous signaling to discover neighbor mesh STAs are performed in broadcast mode. It should be appreciated that 802.11s was not targeted for networks with directional wireless communications.

Figure 3:
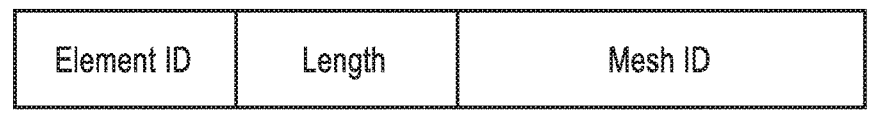
FIG. 3 is a data field diagram depicting a DN identification element for an IEEE 802.11 WLAN.

FIG. 3 depicts a Mesh Identification element (Mesh ID element) which is used to advertise the identification of a Mesh Network. Mesh ID is transmitted in a Probe request, by a new STA willing to join a mesh network, and in beacon and signals, by existing mesh network STAs. A Mesh ID field of length 0 indicates the wildcard Mesh ID, which is used within a Probe Request frame. A wildcard Mesh ID is a specific ID that prevents a non-mesh STA from joining a mesh network. It should be recognized that a mesh station is a STA that has more features than a non-mesh station, for example a mesh network is like having the STA running as a module in additional to some other modules to serve the mesh functionality. If the STA does not have this mesh module it should not be allowed to connect to a mesh network.

FIG. 4 depicts a Mesh configuration element as contained in Beacon frames and Probe Response frames transmitted by mesh STAs, and it is used to advertise mesh services. The main contents of the Mesh Configuration elements are: (a) a path selection protocol identifier; (b) a path selection metric identifier; (c) a congestion control mode identifier; (d) a synchronization method identifier; and (e) an authentication protocol identifier. The contents of the Mesh Configuration Element together with the Mesh ID form a mesh profile.

The 802.11a standard defines many procedures and mesh functionalities including: mesh discovery, mesh peering management, mesh security, mesh beaconing and synchronization, mesh coordination function, mesh power management, mesh channel switching, three address, four address, and extended address frame formats, mesh path selection and forwarding, interworking with external networks, intra-mesh congestion control and emergency service support in mesh BSS.

1.3. Millimeter Wave in WLAN

WLANs in millimeter wave bands generally require the use of directional antennas for transmission, reception or both, to account for the high path loss and to provide sufficient SNR for communication. Using directional antennas in transmission or reception makes the scanning process directional as well. IEEE 802.11ad and the new standard 802.11 ay define procedures for scanning and beamforming for directional transmission and reception over the millimeter wave band.

1.4. IEEE 802.11ad Scanning and BF Training

An example of a mmW WLAN state-of-the-art system is the 802.11ad standard.

1.4.1. Scanning

A new STA operates on passive or active scanning modes to scan for a specific SSID, a list of SSIDs, or all discovered SSIDs. To passively scan, a STA scans for DMG beacon frames containing the SSID. To actively scan: a DMG STA transmits Probe Request frames containing the desired SSID or one or more SSID List elements. The DMG STA might also have to transmit DMG Beacon frames or perform beamforming training prior to the transmission of Probe Request frames.

1.4.2. BF Training

BF training is a bidirectional sequence of BF training frame transmissions that uses a sector sweep and provides the necessary signaling to allow each STA to determine appropriate antenna system settings for both transmission and reception.

The 802.11ad BF training process can be performed in three phases. (1) A sector level sweep phase is performed whereby directional transmission with low gain (quasi-Omni) reception is performed for link acquisition. (2) A refinement stage is performed that adds receive gain and final adjustment for combined transmit and receive. (3) Tracking is then performed during data transmission to adjust for channel changes.

1.4.3. 802.11ad SLS BF Training Phase

This SLS BF Training Phase focuses on the sector level sweep (SLS) mandatory phase of the 802.11ad standard. During SLS, a pair of STAs exchange a series of sector sweep (SSW) frames (or beacons in case of transmit sector training at the PCP/AP) over different antenna sectors to find the one providing highest signal quality. The station that transmits first is called the initiator; the station that transmits second is referred to as the responder.

During a transmit sector sweep (TXSS), SSW frames are transmitted on different sectors while the pairing STA (the responder) receives utilizing a quasi-Omni directional pattern. The responder determines the antenna array sector from the initiator which provided the best link quality (e.g. SNR).

Figure 5:
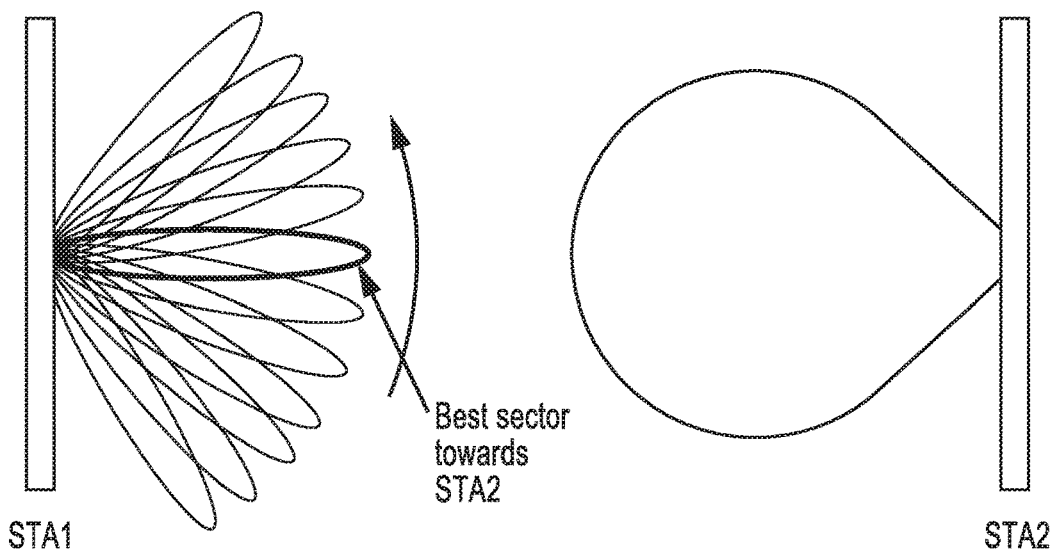
FIG. 5 is a schematic of antenna sector sweeping (SSW) in the IEEE 802.11ad protocol.

FIG. 5 depicts the concept of sector sweep (SSW) in 802.11ad. In this figure, an example is given in which STA 1 is an initiator of the SLS and STA 2 is the responder. STA 1 sweeps through all of the transmit antenna pattern fine sectors while STA 2 receives in a quasi-Omni pattern. STA 2 feeds back to STA 2 the best sector it received from STA 1.

Figure 6:
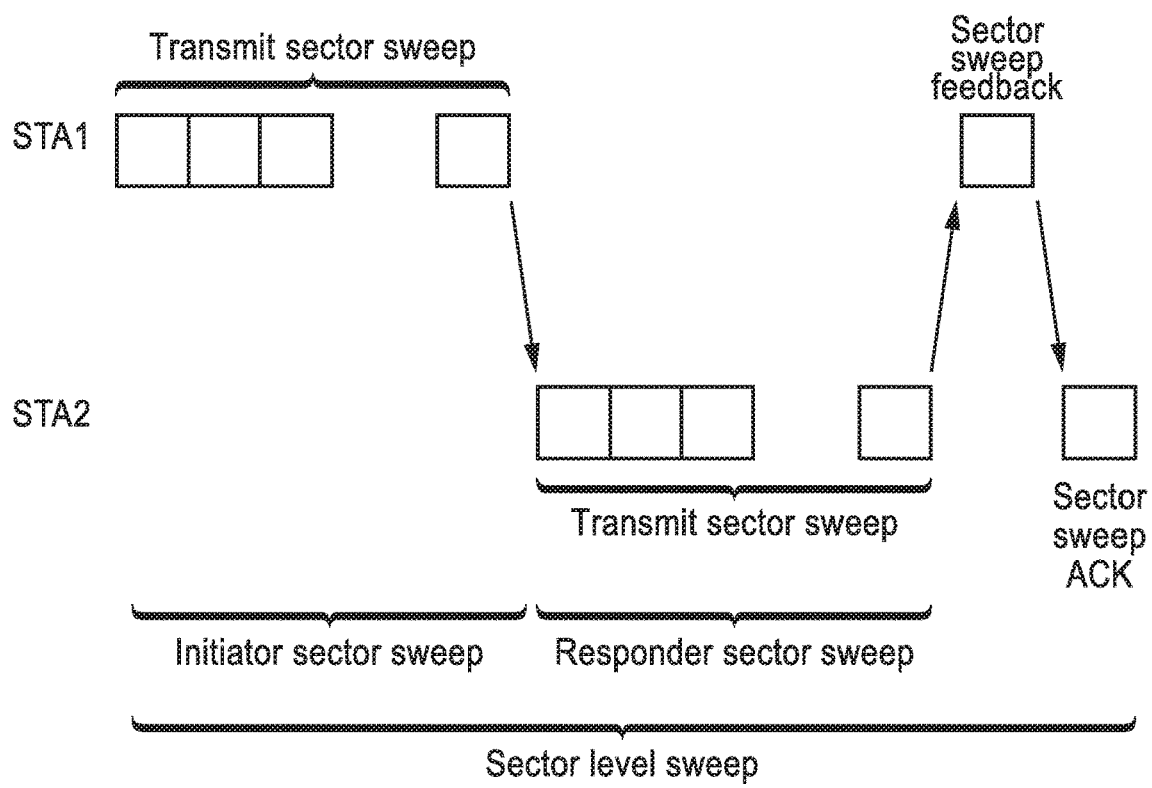
FIG. 6 is a signaling diagram showing signaling of sector-level sweeping (SLS) in the IEEE 802.11ad protocol.

FIG. 6 illustrates the signaling of the sector-level sweep (SLS) protocol as implemented in 802.11ad specifications. Each frame in the transmit sector sweep includes information on sector countdown indication (CDOWN), a Sector ID, and an Antenna ID. The best Sector ID and Antenna ID information are fed back with the Sector Sweep Feedback and Sector Sweep ACK frames.

FIG. 7 depicts the fields for the sector sweep frame (an SSW frame) as utilized in the 802.11ad standard, with the fields outlined below. The Duration field is set to the time until the end of the SSW frame transmission. The RA field contains the MAC address of the STA that is the intended receiver of the sector sweep. The TA field contains the MAC address of the transmitter STA of the sector sweep frame.

FIG. 8 illustrates data elements within the SSW field. The principle information conveyed in the SSW field is as follows. The Direction field is set to 0 to indicate that the frame is transmitted by the beamforming initiator and set to 1 to indicate that the frame is transmitted by the beamforming responder. The CDOWN field is a down-counter indicating the number of remaining DMG Beacon frame transmissions to the end of the TXSS. The sector ID field is set to indicate sector number through which the frame containing this SSW field is transmitted. The DMG Antenna ID field indicates which DMG antenna the transmitter is currently using for this transmission. The RXSS Length field is valid only when transmitted in a CBAP and is reserved otherwise. This RXSS Length field specifies the length of a receive sector sweep as required by the transmitting STA, and is defined in units of a SSW frame. The SSW Feedback field is defined below.

FIG. 9A and FIG. 9B depict SSW feedback fields. The format shown in FIG. 9A is utilized when transmitted as part of an Internal Sublayer Service (ISS), while the format of FIG. 9B is used when not transmitted as part of an ISS. The Total Sectors in the ISS field indicate the total number of sectors that the initiator uses in the ISS. The Number of Rx DMG Antennas subfield indicates the number of receive DMG antennas the initiator uses during a subsequent Receive Sector Sweep (RSS). The Sector Select field contains the value of the Sector ID subfield of the SSW field within the frame that was received with best quality in the immediately preceding sector sweep. The DMG Antenna Select field indicates the value of the DMG Antenna ID subfield of the SSW field within the frame that was received with best quality in the immediately preceding sector sweep. The SNR Report field is set to the value of the SNR from the frame that was received with best quality during the immediately preceding sector sweep, and which is indicated in the sector select field. The poll required field is set to 1 by a non-PCP/non-AP STA to indicate that it requires the PCP/AP to initiate communication with the non-PCP/non-AP. The Poll Required field is set to 0 to indicate that the non-PCP/non-AP has no preference about whether the PCP/AP initiates the communication.

1.5. AODV Routing Protocol

Figure 10A:
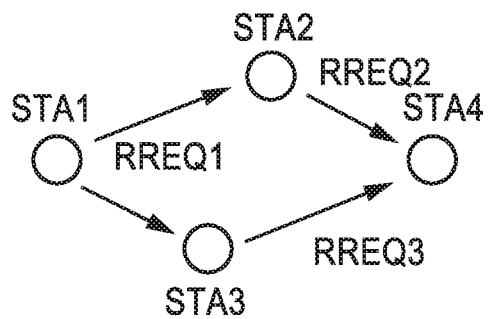
FIG. 10A through FIG. 10C is a network topology diagram of an Ad-hoc On-Demand Distance Vector (AODV) routing protocol.
Figure 10B:
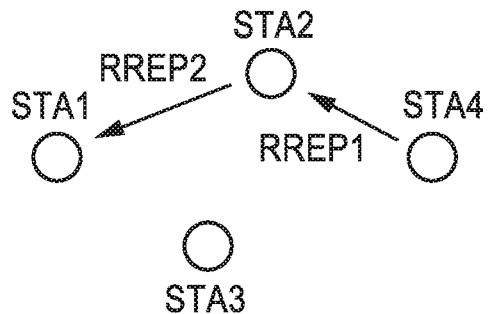
Figure 10C:
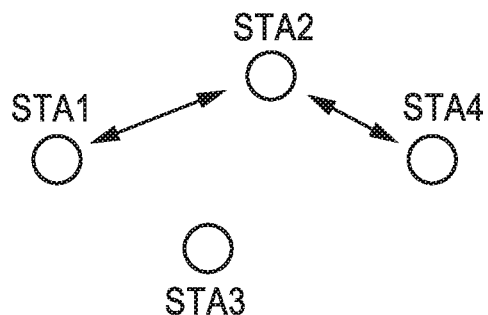

FIG. 10A through FIG. 10C illustrates an example of using an Ad-hoc On-Demand Distance Vector (AODV)

routing protocol. A routing protocol is a set of rules to establish a communication path between an originating station (STA) and a destination STA over multiple hops (Intermediate STAs). AODV is a routing protocol which represents the general essence of current multi-hop routing over a wireless media. With AODV, STAs generates a route according to the following steps as seen in the example of FIG. 10A through FIG. 10C.

Steps 1 through 5 of this AODV routing process are see in FIG. 10A. (1) STA 1 is the originating STA and it broadcasts Routing Request (RREQ) frames (RREQ1). (2) STA 2 receives the RREQ1 and measures quality of the link between itself and the transmitter of the RREQ1 (STA 1), and rebroadcasts the RREQ embedding the link quality info and transmitting a routing request (RREQ2). (3) STA3 receives RREQ1, measures quality of the link between itself and transmitter of the RREQ1 (STA1), and rebroadcasts the RREQ embedding the link quality info (RREQ3). (4) STA4 as the destination STA receives RREQ2 from STA2, measures quality of the link between itself and the transmitter of the RREQ2 (STA2), and accumulates the value with link quality embedded in the RREQ2. In response to this process STA4 obtains information on the end-to-end quality to and from STA1 via STA2. (5) STA4 also receives an RREQ3 from STA3, measures quality of the link between itself and the transmitter of the RREQ3 (STA3), and accumulates the value with the link quality embedded in RREQ3. Accordingly, STA4 also obtains information on the end-to-end quality to and from STA1 via STA3.

Steps 6 through 8 of this AODV routing process are depicted in FIG. 10B. (6) STA4 determines that the link quality to STA1 via STA2 is better (e.g., higher signal-to-noise ratio (SNR)) than via STA3, and so STA4 transmits a routing response (RREP) frame (RREP1) to STA2 to confirm the best route to intermediate and originating STAs, and sets STA2 as the next hop STA toward STA1. (7) STA2 receives this RREP1 from STA4, and recognizes itself as an intermediate STA between STA4 and STA1, and set STA4 as its next hop STA toward STA4. (8) STA2 then further retransmits the RREP (RREP2) toward originating STA1, and sets STA1 as the next hop STA toward STA1.

Steps 9 through 10 of this AODV routing process are depicted in FIG. 10C. (9) STA1 receives RREP2 from STA2, and recognizes that the multi-hop path toward STA4 has been confirmed and the next hop STA to STA4 is STA2. (10) In response to the above sequence, a bidirectional route between STA1 and STA4 via STA2 is established.

2. Station (STA) Hardware Configuration of Disclosure

Figure 11:
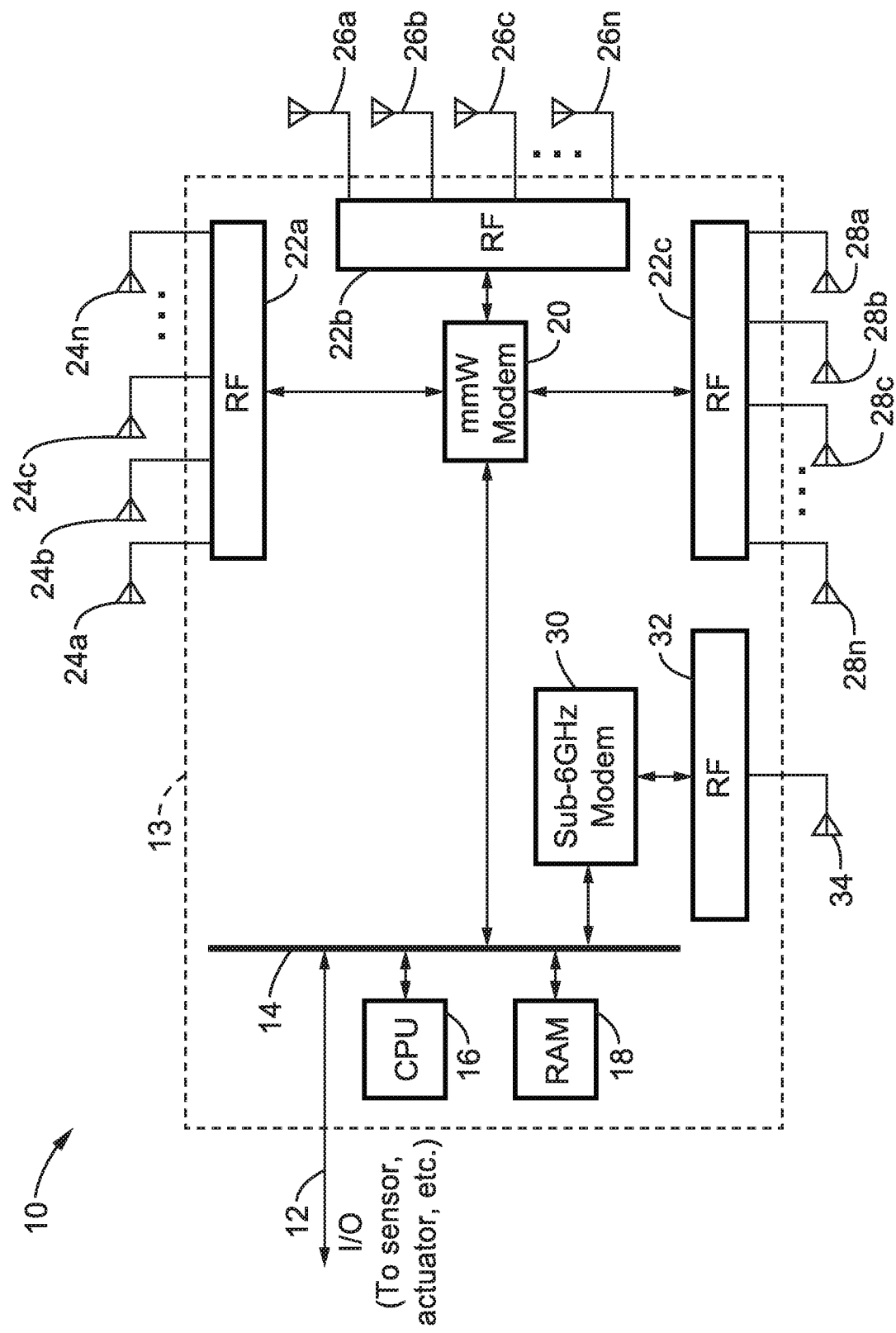
FIG. 11 is a block diagram of wireless mmW communication station hardware as utilized according to an embodiment of the present disclosure.

FIG. 11 illustrates an example embodiment 10 of STA hardware configuration showing I/O path 12 into hardware block 13, having a computer processor (CPU) 16 and memory (RAM) 18 coupled to a bus 14, which is coupled to I/O path 12 giving the STA external I/O, such as to sensors, actuators and so forth. Instructions from memory 18 are executed on processor 16 to execute a program which implements the communication protocols, which are executed to allow the STA to perform the functions of a "new STA", or one of the STAs already in the network. It should also be appreciated that the programming is configured to operate in different modes (source, intermediate, destination), depending on what role it is playing in the current communication context. This host machine is shown configured with a mmW modem 20 coupled to radio-frequency (RF) circuitry 22a, 22b, 22c to a plurality of antennas 24a through 24n, 26a through 26n, 28a through 28n to transmit and receive frames with neighboring STAs. In addition, the host machine is also seen with a sub-6 GHz modem 30 coupled to radio-frequency (RF) circuitry 32 to antenna(s) 34.

Thus, this host machine is shown configured with two modems (multi-band) and their associated RF circuitry for providing communication on two different bands. By way of example and not limitation the intended directional communication band is implemented with a mmW band modem and its associated RF circuitries for transmitting and receiving data in the mmW band. The other band, generally referred to herein as the discovery band, comprises a sub-6 GHz modem and its associated RF circuitry for transmitting and receiving data in the sub-6 GHz band.

Although three RF circuits are shown in this example for the mmW band, embodiments of the present disclosure can be configured with modem 20 coupled to any arbitrary number of RF circuits. In general, using a larger number of RF circuits will result in broader coverage of the antenna beam direction. It should be appreciated that the number of RF circuits and number of antennas being utilized is determined by hardware constraints of a specific device. Some of the RF circuitry and antennas may be disabled when the STA determines it is unnecessary to communicate with neighbor STAs. In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 12:
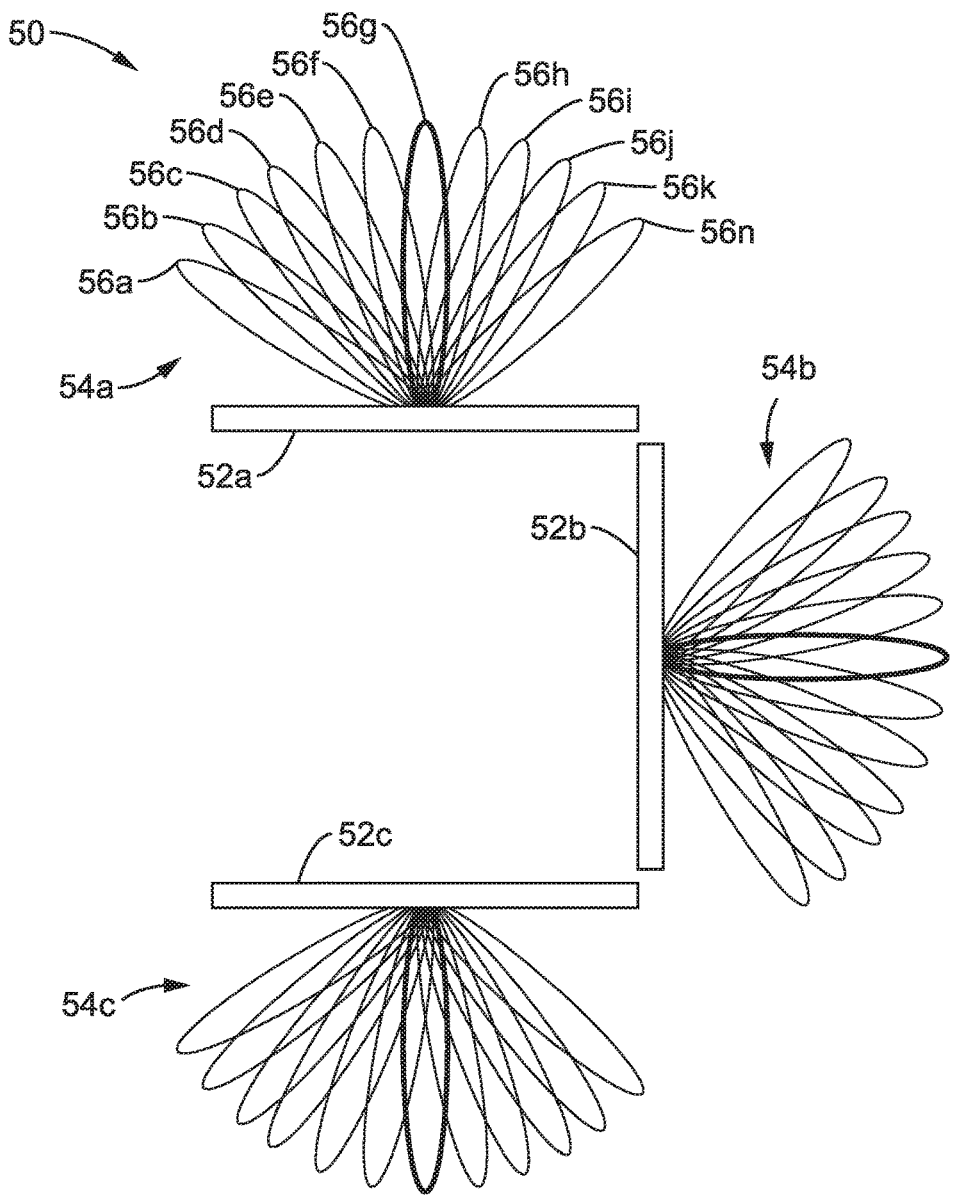
FIG. 12 is a mmW beam pattern diagram for the station hardware of FIG. 10 as utilized according to an embodiment of the present disclosure.

FIG. 12 illustrates an example embodiment 50 of mmW antenna directions which can be utilized by a STA to generate a plurality (e.g., 36) of mmW antenna sector patterns. In this example, the STA implements three RF circuits 52a, 52b, 52c and connected antennas, and each RF circuitry and connected antenna generate a beamforming pattern 54a, 54b, 54c. Antenna pattern 54a is shown having twelve beamforming patterns 56a, 56b, 56c, 56d, 56e, 56f, 56g, 56h, 56i, 56j, 56k and 56n ("n" representing that any number of patterns can be supported). The example station using this specific configuration has thirty six (36) antenna sectors, although the present disclosure can support any desired number of antenna sectors. For the sake of clarity and ease of explanation, the following sections generally exemplify STAs with a smaller number of antenna sectors, but this is not to be construed as an implementation limitation. It should be appreciated that any arbitrary beam pattern can be mapped to an antenna sector. Typically, the beam pattern is formed to generate a sharp beam, but it is possible that the beam pattern is generated to transmit or receive signals from multiple angles.

Antenna sector is determined by a selection of mmW RF circuitry and beamforming commanded by the mmW array antenna controller. Although it is possible that STA hardware components have different functional partitions from the one described above, such configurations can be deemed to be a variant of the explained configuration. Some of the mmW RF circuitry and antennas may be disabled when the STA determines it is unnecessary to communicate with neighbor STAs.

In at least one embodiment, the RF circuitry includes frequency converter, array antenna controller, and so forth, and is connected to multiple antennas which are controlled to perform beamforming for transmission and reception. In this way the STA can transmit signals using multiple sets of beam patterns, each beam pattern direction being considered as an antenna sector.

Figure 13:
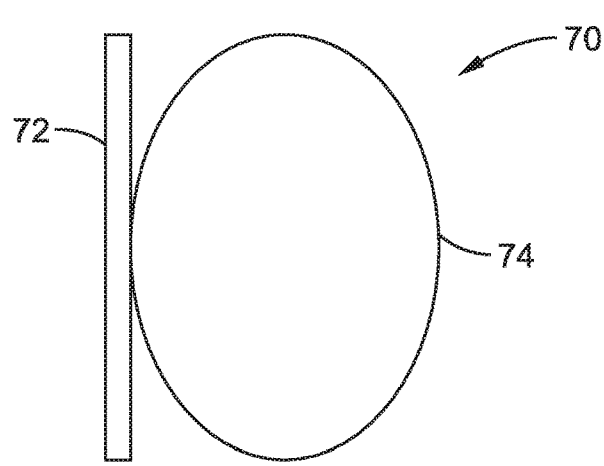
FIG. 13 is a beam pattern diagram for a discovery band communications antenna (i.e., sub-6 GHz), according to an embodiment of the present disclosure.

FIG. 13 illustrates an example embodiment 70 of antenna pattern for the sub-6 GHz modem assumed to use a quasi-Omni antenna 74 attached to its RF circuitry 72, although other circuitry and/or antennas may be utilized without limitation.

3. Introduction to Protocol for Multi-Hop Routing with Backups

In a typical multi-hop network, a route from the originating STA to the destination STA is determined by selecting intermediate STAs for the end-to-end path. Often, the intermediate STAs are chosen so that the links selected for use offer best link quality, as seen in the AODV example.

It will be appreciated that in mmW systems, links are sensitive to blockage and other channel impairments. In time-sensitive applications, it is important that a blocked link is quickly detected and replaced with an alternative link. The present disclosure describes a protocol for a multi-hop mmW network to provide multiple next-hop options (one primary and several backups) to reach to the destination STA. In this case, if the link to the primary next-hop is blocked, other alterative next-hops can be deployed quickly.

In order to provide multi-hop communications with multiple next-hop options, the disclosure describes a system with the following elements. (A) Routing tables at each station which contain multiple next-hop options in order to reach to the destination STA. (B) Each STA proactively assures that its routing table entries are up-to-date and that multiple next-hop options are reachable and ready to be deployed at any time. (C) A new flooding mechanism is proposed for RREQ and RREP messages to discover several routes between the originating STA and destination STA. (D) STAs deploy a Forwarding Table to minimize the flooding overhead of the routing management frames.

Accordingly, the present disclosure is a novel routing protocol that provides multiple next-hop options in order to reach to a destination STA, and includes the following components. (1) STAs efficiently populate the routing table to include multiple next-hop (one primary and several backup) per destination STA nodes. By way of example and not limitation, for the present case it is assumed that the number of next-hop options per destination STA is 2, one primary and one backup next-hop. However, it should be appreciated that the disclosed technology can be configured for obtaining any desired number of available next-hop STAs. (2) STAs make sure that the primary and backup next-hop nodes are reachable and ready to be deployed at any moment that blockage occurs.

4. Neighbor Lists and Routing Tables

4.1. Neighbor List

Information obtained from performing the antenna sector sweep is utilized in the STA building a database, which is referred to herein as a Neighbor List, within which it stores received signal quality information for each antenna section for the STA in its memory. In at least one embodiment, each instance of the Neighbor List is also configured to store miscellaneous information on the neighbor STA. The object of the Neighbor List is to allow each STA to be made aware of its neighbor STAs so that the best transmit/receive sectors can be selected.

By way of example and not limitation, consider a field used for each neighbor with an entry in that field containing receive quality (RxQuality) for each direction for that station. For the example considering the previous topology example of FIG. 10A through FIG. 10C, it will be noted that STA 1 recognizes STA2 and STA3 as its neighbor STAs, and creates 2 instances of the Neighbor List entry. STA1 then stores receive link quality information to RxQuality[N], where N is associated with Tx Antenna Sector of the neighbor STA.

4.2. Routing Table

In the following descriptions an originating station (source) is considered a station (STA) which initiates a communication to another station (STA) which is referred to as the destination station. Routing Tables are constructed as an outcome from the route discovery process, which will be explained in the later clause. Prior to transmitting a data frame to a destination STA, the originating STA sets up a route to the destination STA. The route to the destination STA is managed based on a Routing Table. The Routing Table contains a record (herein depicted in a column form) per destination STA, so that the originating STA can look up the record for the destination STA in preparation for transmitting a frame to the destination STA.

When a STA has a data frame to transmit to a destination STA, it looks up this destination in the Routing Table, and sets the Reception Address (RA) field of the frame to an address stored in NextHop. Each STA maintains a routing table which provides information on reaching destination STAs. Information for each destination STA is stored in a record (e.g., column) of the routing table. For instance in the examples described, each column of the routing table contains the following information: (a) Destination: indicating the destination STA address; (b) NextHop: which indicates the immediate next-hop STA in order to reach to the Destination STA; (c) Metric: is a value that determines distance to the destination STA using NextHop STA; (d) Lifetime: indicates the expiration time of routing information to use NextHop; (e) Backup NextHop: is the backup next-hop STA that can be used to reach to the Destination STA in case the NextHop is not reachable (e.g., due to blockage); (f) Backup Metric: is a value that determines distance to the destination STA if the backup next hop is deployed. (g) Backup Lifetime: indicates the expiration time of routing information to use Backup NextHop.

Figure 14:
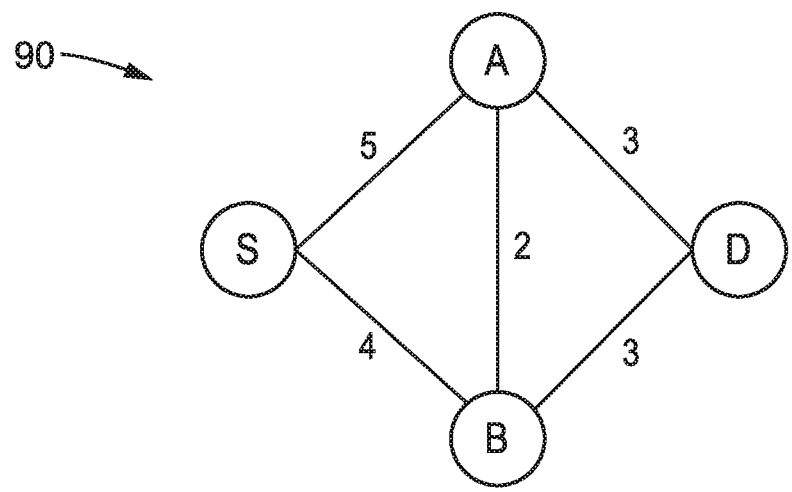
FIG. 14 is a network topology diagram of four example stations as utilized according to an embodiment of the present disclosure.

FIG. 14 illustrates an example network 90 showing a number of stations. In the figure each edge represents a bi-directional link between two nodes and is labeled with a link metric, specifically in this case the distance of that edge between stations. The source STA is marked as "S" and destination STA is marked as "D". As a result, Table 1 is obtained as the routing table for the origination station S to reach to destination station D.

4.3. Forwarding Tables

Each STA has one Forwarding Table through which it keeps track of the type of frames (RREQ or RREP) that it has forwarded to its neighbor STAs along with the sequence number and metric of the message. The forwarding Table has one column (record) per neighbor STA, and in at least one example embodiment it contains the following elements. (a) Neighbor: is the address of the neighbor STA. (b) OrigSTA: is the originating STA of the routing management frame that has been forwarded to the Neighbor node. (c)

SeqNum: is the Sequence number of the routing management frame that has been sent to Neighbor node. (d) Type: is the type (RREQ/RREP) of routing management frame that has been sent to Neighbor node. (e) Metric: is the metric of the routing management frame that has been sent to Neighbor node.

Upon receiving several copies of the same routing management frame, (same OrigSTA and same SeqNum) at an STA, the STA picks the best frame (based on the metric) and forwards it to its neighbor STAs, excluding the transmitter of the message. Thereafter, the STA updates its Forwarding Table entries for its neighbors. Table 2 illustrates an example Forwarding Table of Originating STA S for the network shown in FIG. 14.

4.4. Multi-hop Routing with Multiple Next Hop Nodes

The example of a mmW network consists of several STA nodes is considered in which there are several intermediate STAs capable of relaying data traffic from the originating STA to the destination STA (depending on the connectivity and link configurations between STAs). In order to establish multi-hop routes, the originating STA sends a route request (RREQ) to its neighbor STAs, assuming that the STAs have previously performed a Sector Sweep (SSW). Each one-hop neighbor (in direct range) of the originating STA receives the RREQ frame and updates its routing table with an entry to the originating STA. Each neighboring STA then forwards the RREQ to its one-hop neighbors as well, excluding the originating STA from which the RREQ was received.

Figure 15:
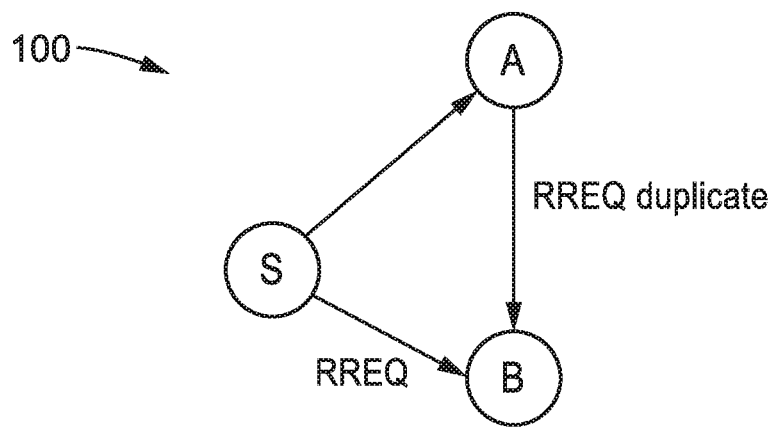
FIG. 15 is a network topology diagram of three example stations as utilized according to an embodiment of the present disclosure.

FIG. 15 illustrates an example embodiment 100 showing a network with three STAs, with STA B receiving a first Routing Request (RREQ) frame from the originating STA and another RREQ from its one-hop neighbor STA A when STA A forwards the RREQ to its neighbors (that includes B as well). Thus, it is seen that as the forwarding of RREQs continues, intermediate STAs may receive duplicate RREQs from other STAs.

In response to receiving RREQ messages, the protocol determines what the best RREQ and second best RREQ frames are in terms of the metric, to decide the next-hop and backup next-hop node to the originating STA in the routing table of the Relay STA. In the example above, STA B sets A as the backup next-hop to reach to Node S, assuming that the direct link metric from S to B is more beneficial (e.g., less delay, improved SNR, etc.) metric than the sum of the link metrics S to A and A to B.

For each neighbor STA, the STA determines the best received RREQ, excluding the RREQ that has been received from the same neighbor STA, and forwards the best RREQ to its neighbor STA, and records the forwarding action in its Forwarding Table. The destination STA receives potentially several RREQ messages, and sends an Routing Reply (RREP) frame to the same STA from which a RREQ was received at the destination. Each Relay (intermediate) STA that receives an RREP message, updates its routing table to the destination STA. If the Relay STA receives more than one RREP, it selects the best RREP frame and forwards it to its one-hop neighbor STAs, and records the forwarding operation in its Forwarding Table. Similar to RREQ frames, each RREP frame and its duplicate versions determine the next-hop and backup next-hop. The process of forwarding RREP frames continues until the RREP message is received at the originating STA. According to this process, the originating STA potentially receives more than one RREP message, and it selects a hierarchy of routes, first best and second best in this example, based on the RREP messages and records them as the next-hop and backup next-hop to reach to the Destination STA.

4.5. Routing Management Frame Format

4.5.1. Routing Request (RREQ) and Routing Reply (RREP)

Figure 16:
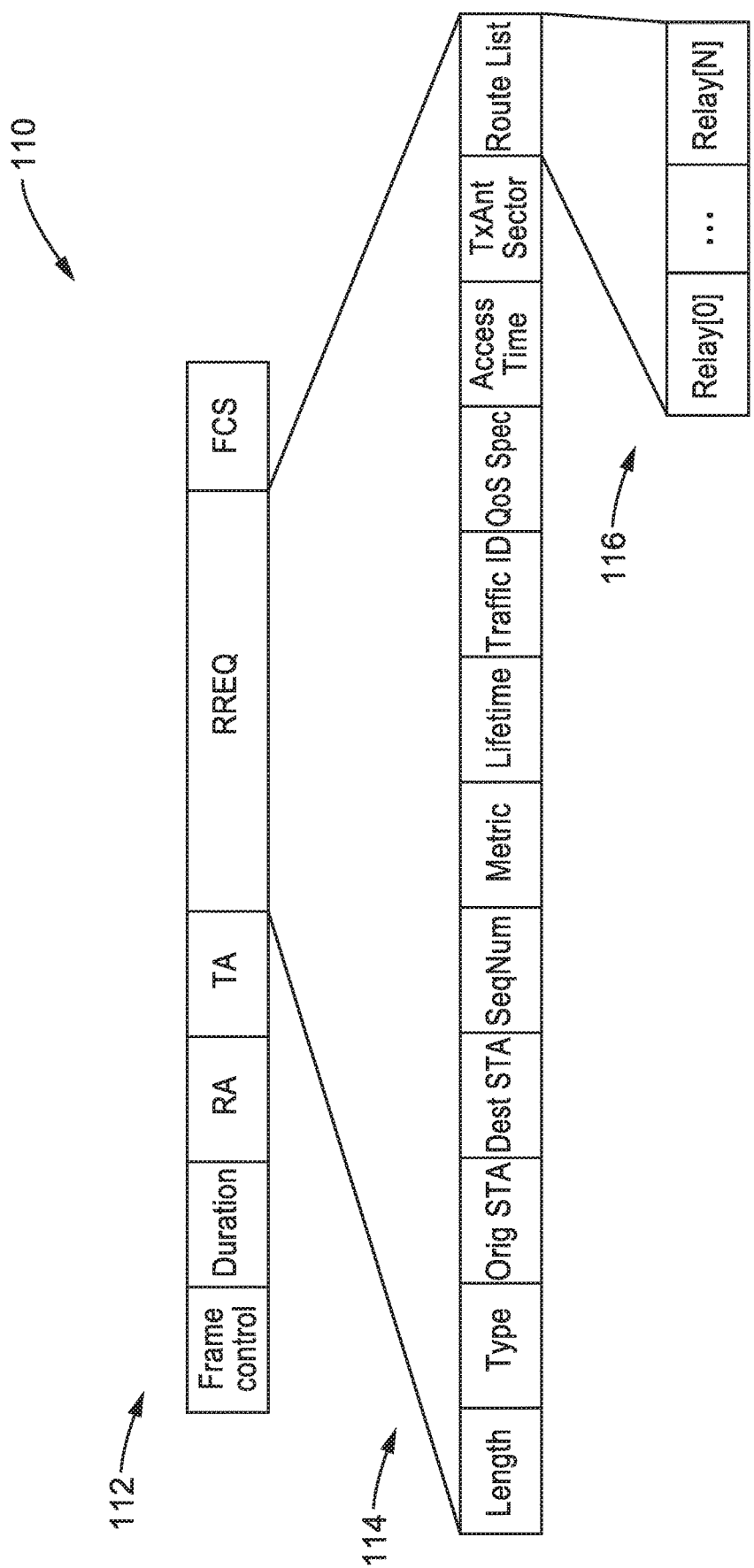
FIG. 16 is a data field diagram of a route request frame (RREQ) according to an embodiment of the present disclosure.

FIG. 16 illustrates an example embodiment 110 of an RREQ frame 112 and its subfields 114, 116. The Frame 112 contains: (a) a Frame Control field indicating the type of frame; (b) a Duration field containing NAV information (virtual carrier-sensing mechanism) used for Carrier-Sense Multiple Access with Collision Avoidance (CSMA/CA) channel access; (c) Recipient Address (RA) field contains address of the recipient of the frame; (d) The Transmitting Address (TA) field contains the address of the STA that transmits the frame; (e) An RREQ field containing routing request particulars described below; and (f) A Frame Check Sequence (FCS) field is included in the RREQ frame.

The subfields 114 contained within the RREQ field contain: (a) Length: indicating the length of this frame; (b) Type: as the type of this frame (RREQ); (c) Orig STA: is the address of the Originating STA; (d) Dest STA: is the address of the Destination STA; (e) SeqNum: is the Sequence Number identifying this route set up, and is a value updated (e.g., incremented) every time the originating STA attempts to set up or maintain the route; (f) Metric: is a measurement which carries accumulated metric value toward the destination STA; (g) Lifetime: is the lifetime to the expiration time of this route; (h) Traffic ID: is the Traffic Identification of the associated traffic stream; (i) QoS Spec: is a traffic specification of this traffic stream (i.e., bandwidth, or similar traffic specifier); (i) Access Time: the channel time that the Transmitting Address (TA) STA uses for the transmission of data frames toward the Reception Address (RA) STA; (j) TxAntSector: is the Transmit (Tx) Antenna Sector that TA STA uses for the transmission of the data frames toward RA STA. (k) Route List: is the ID of the STAs that this frame has reached (visited) so far, in which an ID of a STA is appended to each RREQ message as seen in sub-fields 116, when it receives that frame.

Figure 17:
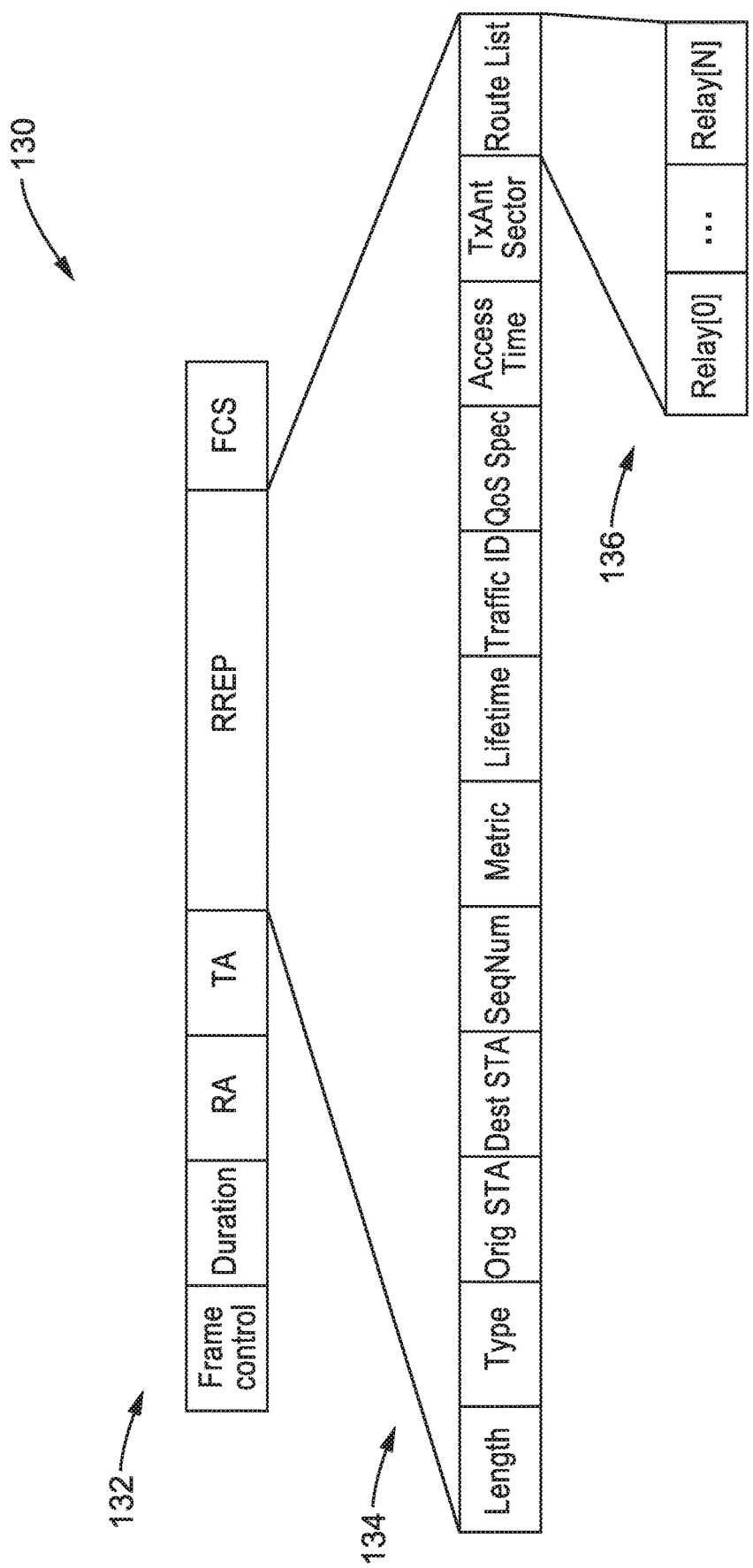
FIG. 17 is a data field diagram of a route reply frame (RREP) according to an embodiment of the present disclosure.

FIG. 17 illustrates an example embodiment 130 of the RREP frame 132, and its sub-frame hierarchy 134 and 136. The RREP frame 132 contains the following fields: (a) a Frame Control field indicating the type of frame; (b) a Duration field containing NAV information (virtual carrier-sensing mechanism) used for Carrier-Sense Multiple Access with Collision Avoidance (CSMA/CA) channel access; (c) Recipient Address (RA) field contains address of the recipient of the frame; (d) The Transmitting Address (TA) field contains the address of the STA that transmits the frame; (e) An RREP field containing routing request particulars described below; and (f) A Frame Check Sequence (FCS) field is included in the RREQ frame.

The subfields 134 contained within the RREP field above contain the following sub-fields: (a) Length: indicating the length of this frame; (b) Type: as the type of this frame (RREP); (c) Orig STA: is the address of the Originating STA; (d) Dest STA: is the address of the Destination STA; (e) SeqNum: is the Sequence Number identifying this route reply, and the same as the RREQ being replied to; (g) Lifetime: is the lifetime to the expiration time of this route reply; (h) Traffic ID: is the Traffic Identification of the associated traffic stream; (i) QoS Spec: is a traffic specification of this traffic stream (i.e., bandwidth, or similar traffic specifier); (i) Access Time: the channel time that the Transmitting Address (TA) STA uses for the transmission of data frames toward the Reception Address (RA) STA; (j) TxAntSector: is the Transmit (Tx) Antenna Sector that TA STA uses for the transmission of the data frames toward RA STA. (k) Route List: is the ID of the STAs that this RREP frame has reached (visited) so far, in which an ID of a STA is appended to each RREP message as seen in sub-fields 136, when it receives that frame.

4.5.2. Status Request (SREQ) and Status Reply (SREP).

Figure 18:
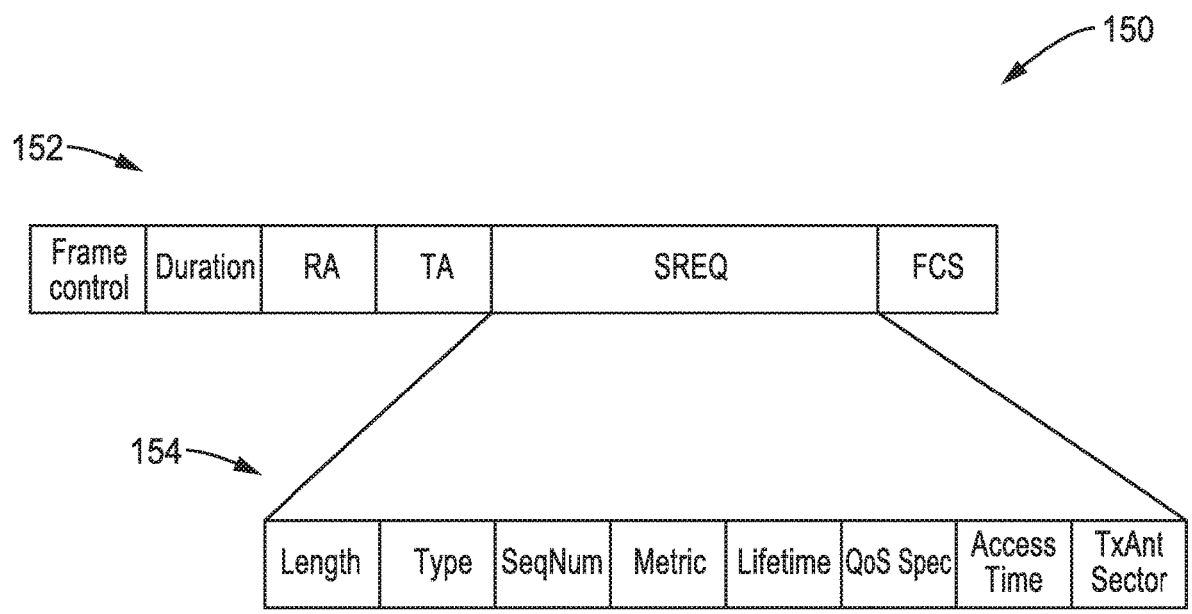
FIG. 18 is a data field diagram of a status request frame (SREQ) according to an embodiment of the present disclosure.

FIG. 18 illustrates an example embodiment 150 of a Status Request frame 152 and its sub-fields 154. The SREQ frame 152 contains the following fields: (a) a Frame Control field indicating the type of frame; (b) a Duration field containing NAV information used for CSMA/CA channel access; (c) Recipient Address (RA) field contains address of the recipient of the frame; (d) The Transmitting Address (TA) field contains the address of the STA that transmits the frame; (e) An SREQ field containing routing request particulars described below; and (f) A Frame Check Sequence (FCS) field is included in the RREQ frame.

The SREQ field contains the following sub-fields 154: (a) Length: length of this frame; (b) Type: type of this frame (SREQ); (c) SeqNum: is the Sequence Number identifying this SREQ frame, and is updated (e.g., incremented) every time the TA sends a new status request message; (d) Metric: is a link metric from the transmitter STA to receiver STA; (e) Lifetime: is the lifetime to the expiration time of this request; (f) QoS Spec: is a traffic specification of this traffic stream (i.e., bandwidth, or similar traffic specifier); (g) Access Time: is the channel time that the TA STA (the STA identified by the TA field) uses for the transmission of data frames toward RA STA (the STA identified by the RA field); (h) TxAntSector: is the Tx Antenna Sector that the TA STA uses for the transmission of the data frames toward RA STA.

Figure 19:
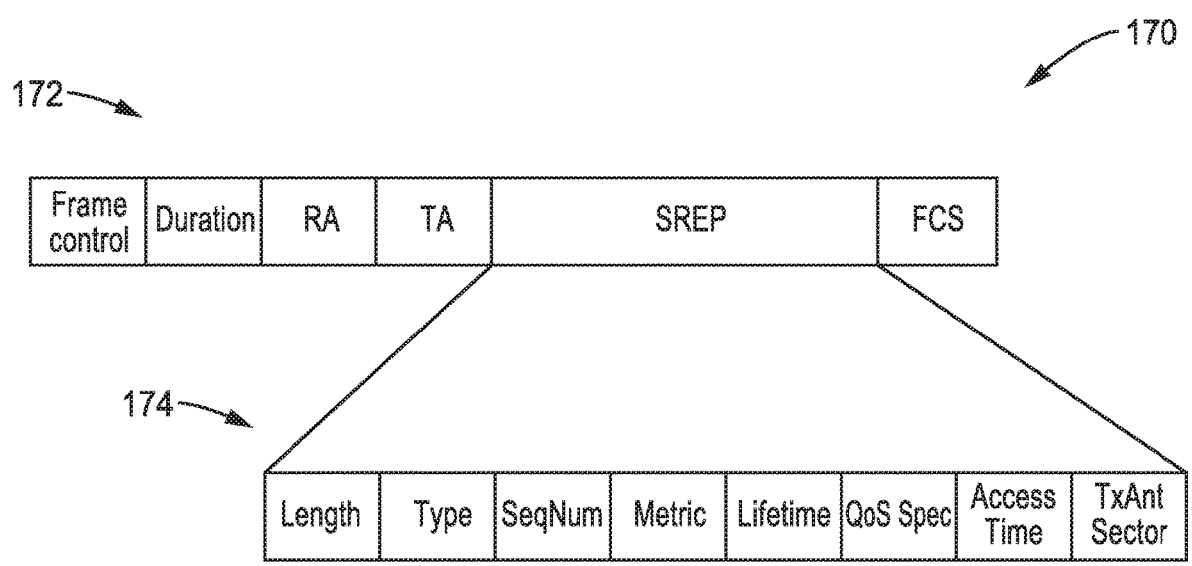
FIG. 19 is a data field diagram of a status reply frame (SREP) by the originating station (STA) according to an embodiment of the present disclosure.

FIG. 19 illustrates an example embodiment 170 of a Status Reply frame 172 and its sub-fields 174. The SREP frame 172 contains identical fields to that of the SREQ frame except for having an SREP field, instead of an SREQ field.

4.6. RREQ and RREP Transmission and Reception Behavior 4.6.1. RREQ Transmitter STA FIG. 20 and FIG. 21 illustrate example embodiments 190, 210 of RREQ transmitter steps, when the originating STA sends out route discovery requests to its neighbor STAs.

4.6.1.1. RREQ Transmitter STA Logic Flow 1

Figure 20:
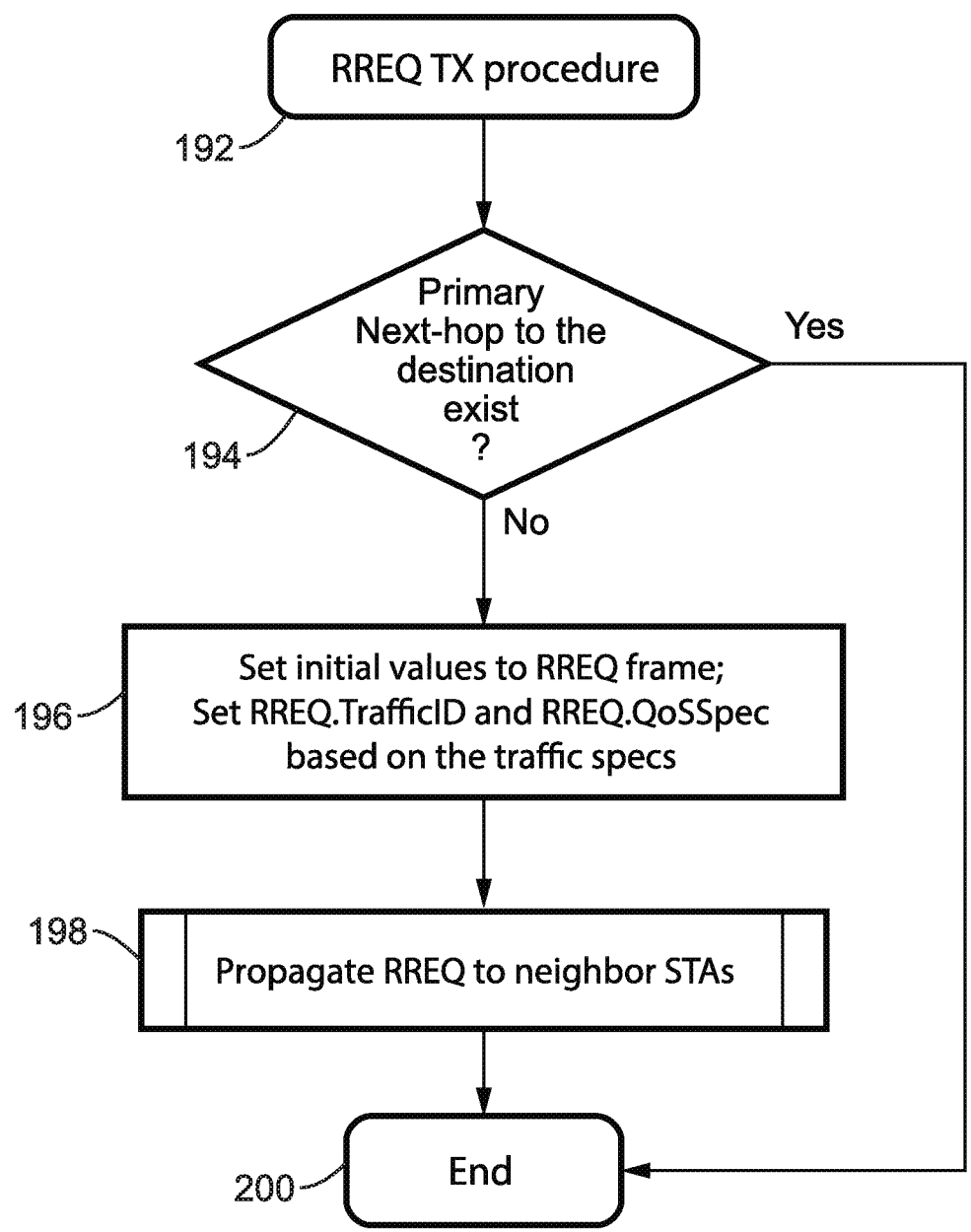
FIG. 20 is a flow diagram of Route Request (RREQ) logic as performed according to an embodiment of the present disclosure.
Figure 21:
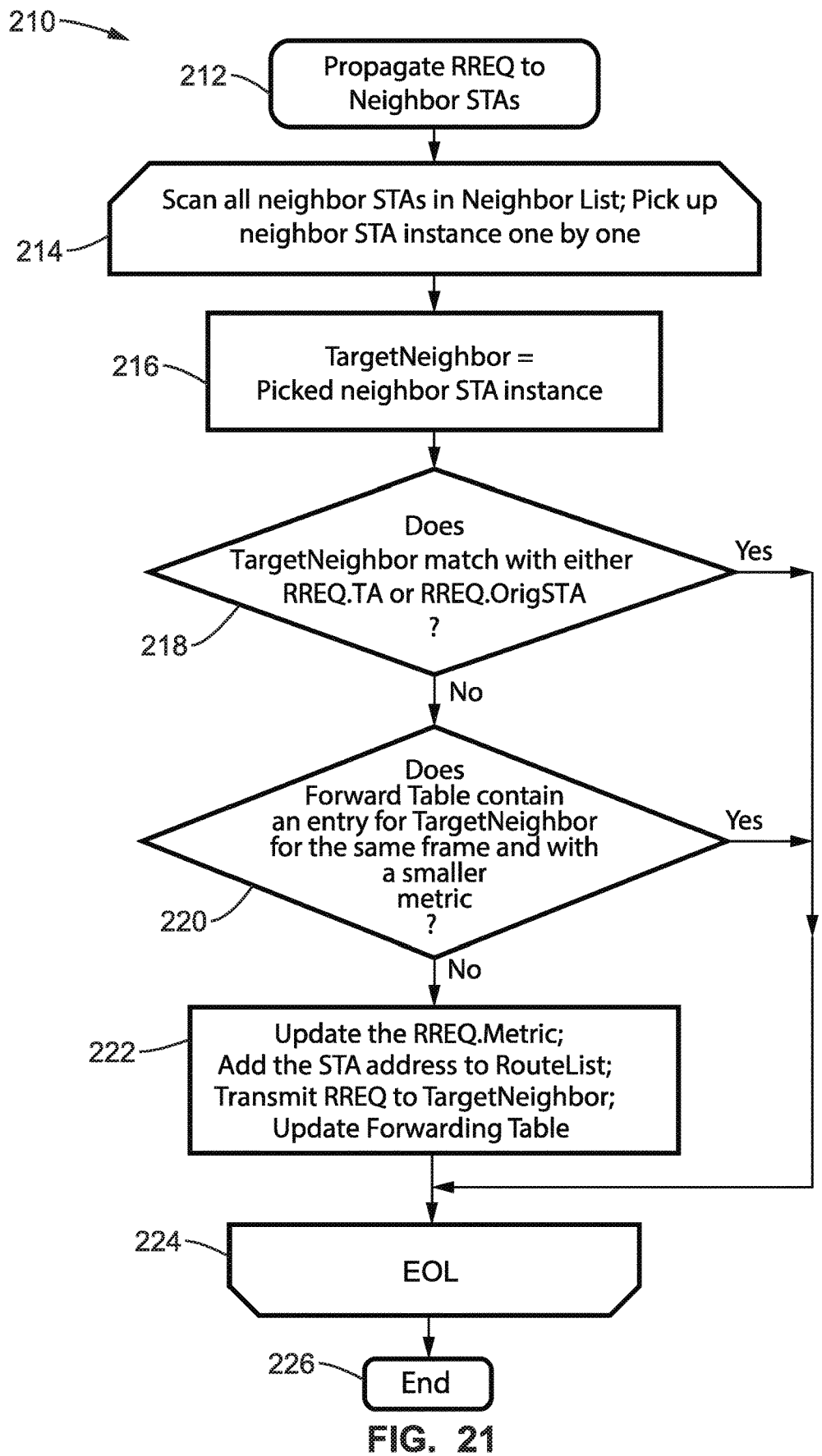
FIG. 21 is a flow diagram of Route Request (RREQ) propagation logic to one-hop neighbors according to an embodiment of the present disclosure.

In FIG. 20 is shown the RREQ transmit logic 190 by the originating STA, which starts at block 192. In order to transmit the route discovery request, the originating STA first checks 194 the routing table and if there is no next-hop entry for the destination STA, then it initiates the RREQ transmission at block 196 by setting initial values for the RREQ frame and then propagating 198 the RREQ frame to its one-hop neighbor STAs, and the routine ends 200. This propagation 198 is shown in detail in FIG. 21. Otherwise, if it is determined at block 194 that there is a next hop to the destination, then execution moves from block 194 to the end 200 of the routine.

4.6.1.2. RREQ Transmitter STA Logic Flow 2

FIG. 21 illustrates an example embodiment 210 for propagating the RREQ frame to its one-hop neighbor STAs. Execution commences at block 212. A STA keeps a list of its one-hop neighbor STAs, this list is called the Neighbor List. The STA that has a RREQ frame to propagate to its neighbor STAs, scans it Neighbor list and selects (picks) 214 STAs, one by one. The Target Neighbor is set to the picked neighbor STA instance 216. It is seen in the flow diagram that the STA forwards the RREQ to its neighbor STA, if and only if none of the following conditions is true. A check is made at block 218 to determine if the neighbor STA is the transmitter of the RREQ or neighbor STA is the OrigSTA of the RREQ. If it is then execution moves from block 218 following the Yes path directly to block 224. Otherwise, if the neighbor is not the originating station, nor is it the transmitter STA, then execution follows the No path to block 220 which checks the forwarding table for entries for the target neighbor to determine if the STA has already forwarded the same RREQ message (same OrigSTA and the same sequence number) with a smaller metric to the neighbor STA. If it has already forwarded the same RREQ with a smaller metric, then execution follows the Yes path to reach block 224. Otherwise, if it has not already forwarded the RREQ with a smaller metric, then execution follows the No path to block 222. At block 222, in preparation for forwarding the RREQ message to its neighbor STAs, the RREQ metric is updated by adding the estimated link metric between RREQ.TA and itself to the metric field of the RREQ. Execution moves to block 224 which merely indicates the end of looping construct (EOL) that goes through the neighbor list picking all neighbor STAs one by one, after which execution ends 226.

4.6.2. RREQ Receiver STA Behavior

Figure 22A:
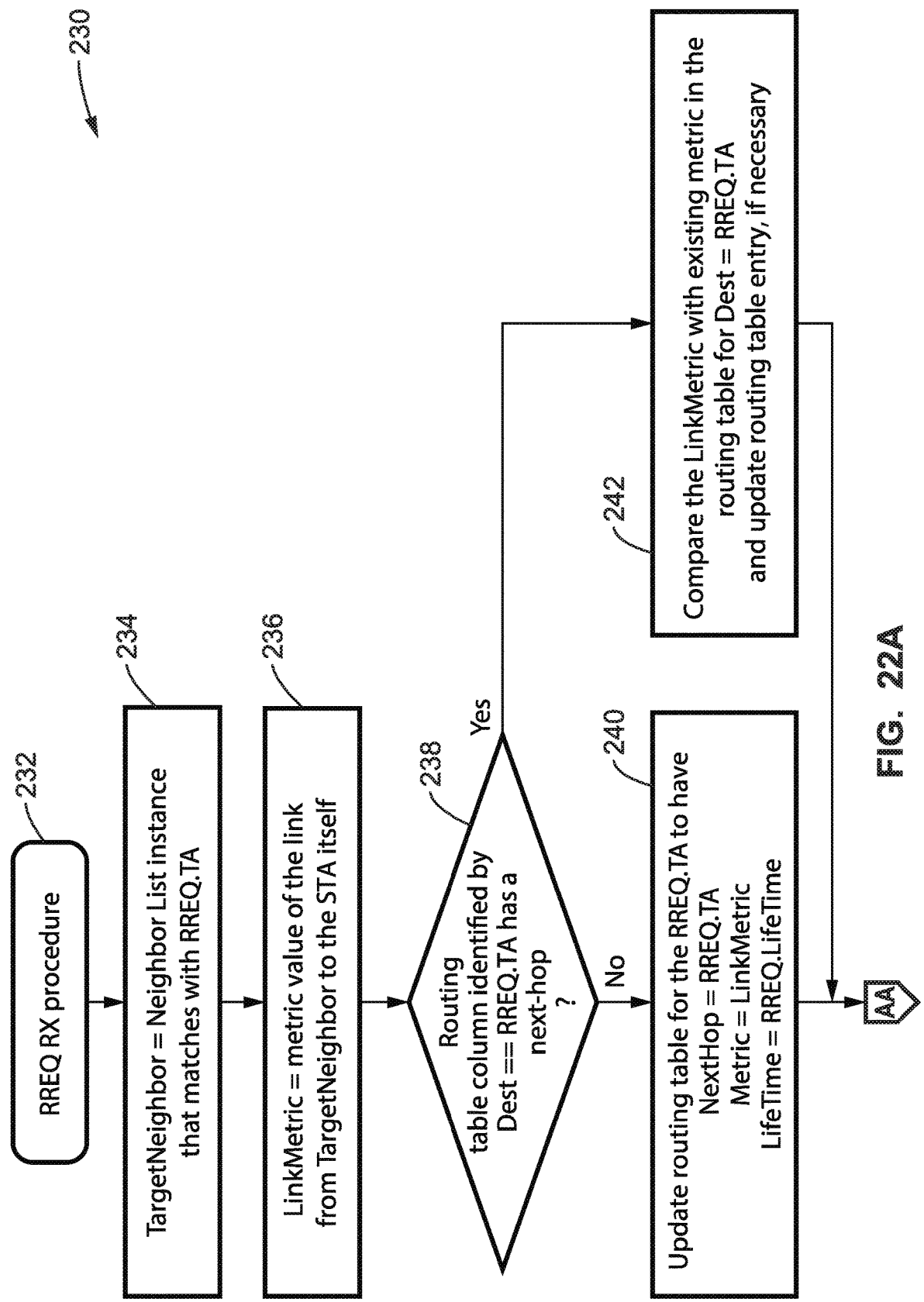
FIG. 22A through FIG. 22C is a flow diagram of logic for receiving Route Request (RREQ) frames according to an embodiment of the present disclosure.
Figure 22B:
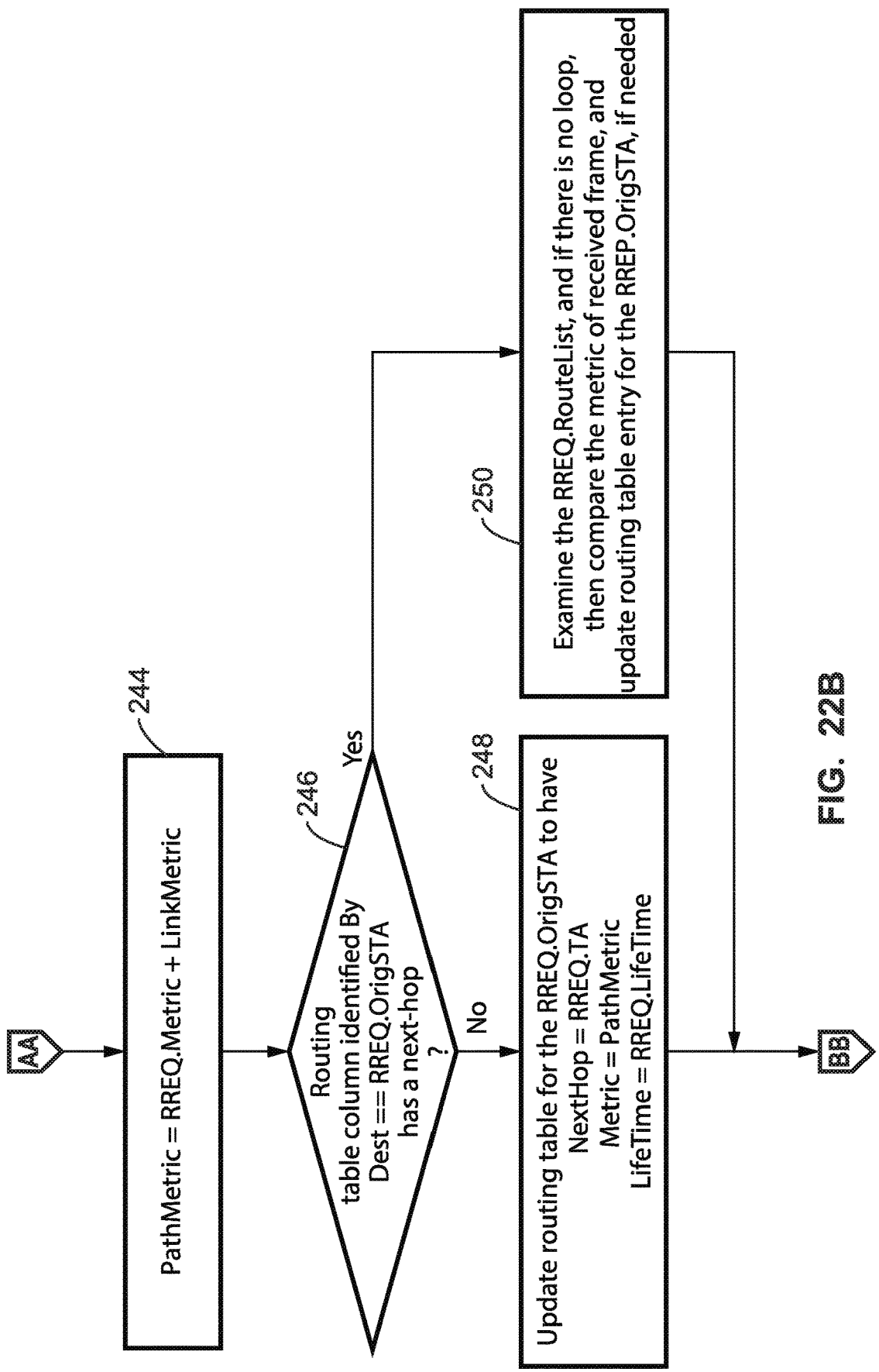
Figure 22C:
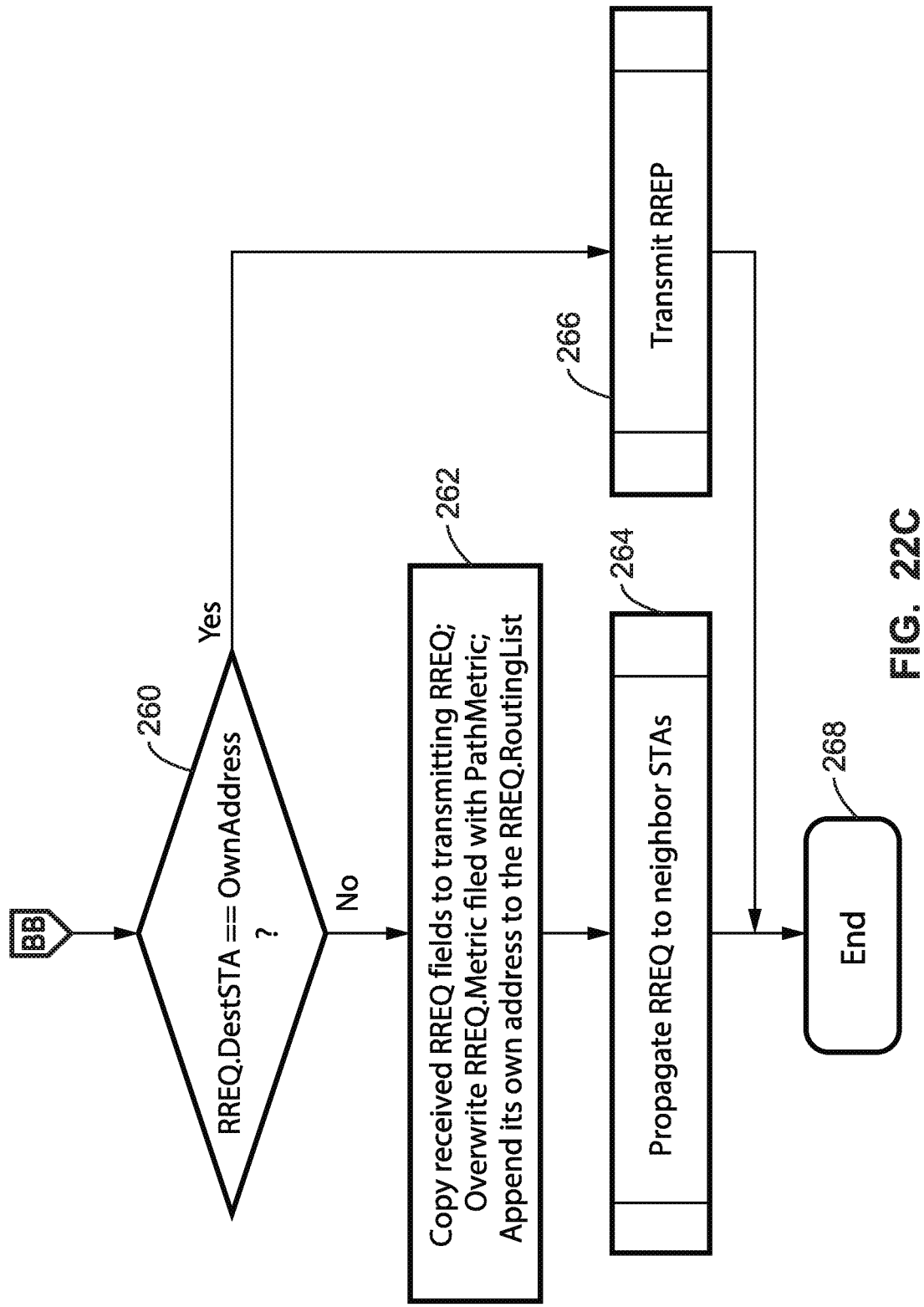

FIG. 22A through FIG. 22C illustrate an example embodiment 230 of STA operation when it receives an RREQ message. The process commences at block 232 in FIG. 22A, and at block 234 the Target neighbor is set to the neighbor list instance (entry) that matches with the RREQ.TA. In block 236 it estimates the link metric from the STA (i.e., receiver of the RREQ) to the RREQ.TA. A check 238 is performed to determine if there is already a NextHop STA available to reach to RREQ.TA. If there is not a NextHop available, execution reaches block 240, at which the next hop is set to RREQ.TA and the column is populated that corresponds to RREQ.TA by setting the metric to the proper value of LinkMetric and the LifeTime being set to the RREQ LifeTime, after which execution reaches block 244 in FIG. 22B. Otherwise, if the check at block 238 in FIG. 22A indicates that there is a next hop available, then execution reaches block 242 where it compares the value of the estimated link metric with existing metric in the routing table and updates the NextHop and Backup NextHop entries as necessary, after which execution reaches block 244 in FIG. 22B. At block 244 the PathMetric is set to the sum of the RREQ.Metric and the LinkMetric, with execution reaching block 246.

A check is made at block 246 to determine if the record corresponding to the originating STA has a valid next-hop option available. If the check is affirmative, then execution follows the Yes path to block 250 which updates the routing table entry as needed for RREQ.OrigSTA based on examining the RREQ.RouteList, determining that there is no loop, and comparing the metric of the received frame. Otherwise, if it determined at block 246, that the record corresponding to the originating STA does not have a next-hop option available, then block 248 is reached, which updates the routing table for RREQ.OrigSTA setting NextHop to the RREQ.TA, Metric to the PathMetric, and LifeTime to the RREQ LifeTime, before execution reaches block 260 in FIG. 22C.

At block 260 a check is made to determine if the destination address is its own STA address. If the destination is its own address, then block 266 is reached where an RREP is transmitted, before ending 268 processing. Otherwise, if block 260 determines the destination is not its own address, then processing reaches block 262 at which time, fields are copied from the received RREQ into an RREQ frame being built for transmission within which the RREQ metric is overwritten with the PathMetric and by appending its own address into the RREQ.RoutingList, and followed by block 264 which propagates the RREQ to neighboring STAs before ending 268 the routine.

Thus, it will be seen above that a number of checks are made in this process. The STA examines and processes the received RREQ to determine if it is a duplicate RREQ frame received from RREQ.OrigSTA or not. If the RREQ has not been received before (e.g., through a different path), then the STA updates the routing table for the primary next-hop entry. If the RREQ is detected to be a duplicate, then the STA extracts the metric value from the RREQ message and updates the routing table based on the metric of the duplicate RREQ message and metrics already recorded in the routing table. If the DestSTA address in the RREQ frame is the same as the address of the STA itself, it means that the RREQ frame has received to the destination STA. In this case, the STA should initiate the RREP transmission. If the DestSTA is not equal to the address of the STA itself, it means that the STA is an intermediate node and it needs to propagate the RREQ to its neighbor STAs, according to the logic described in the previous flowchart. This provides for sending out a proper RREQ or RREP depending on the result of these checks.

4.6.3. RREP Transmitter STA Behavior

Figure 23:
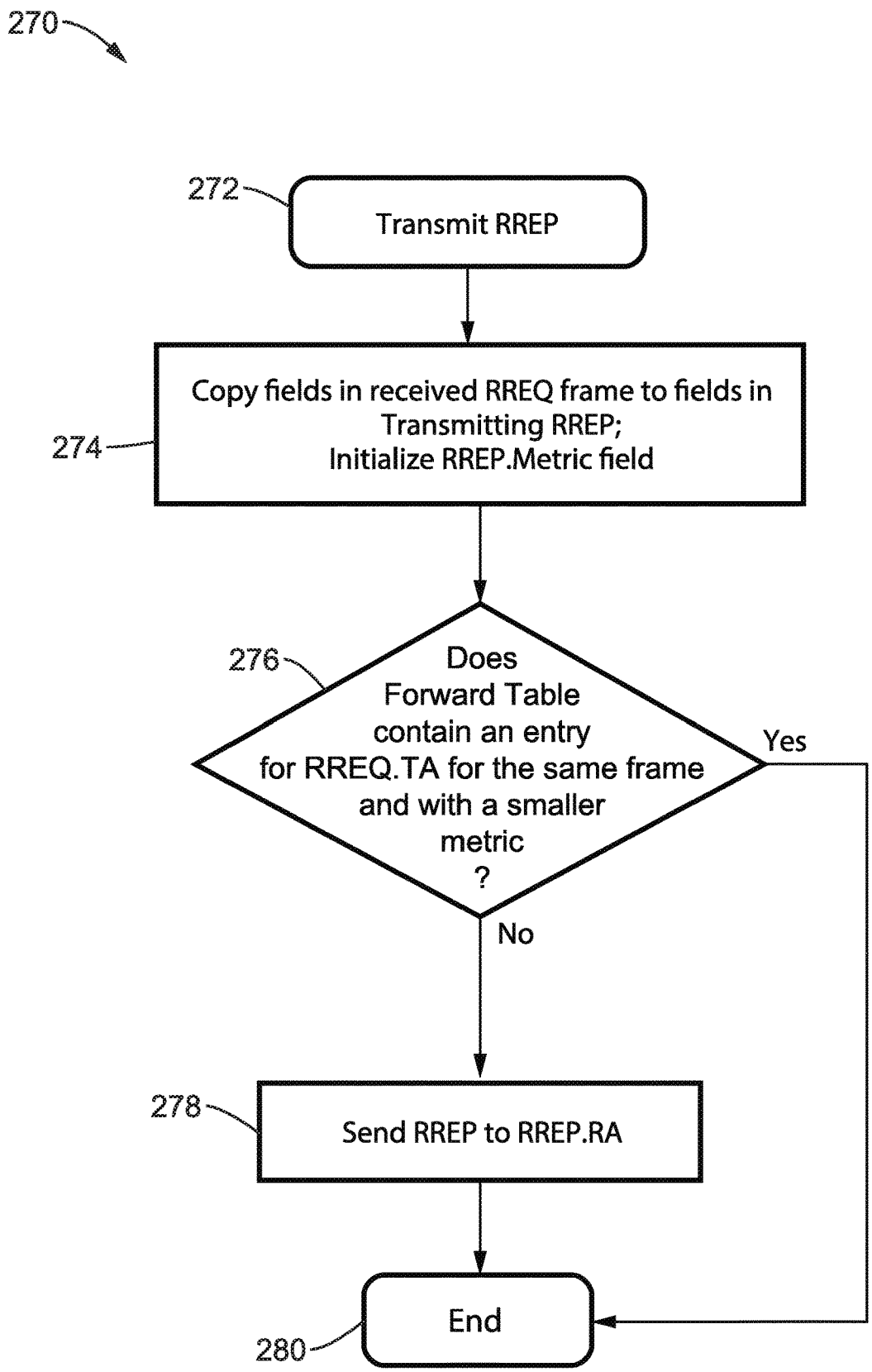
FIG. 23 is a flow diagram of sending Route Reply (RREP) frames from a destination station (STA) according to an embodiment of the present disclosure.

FIG. 23 illustrates an example embodiment 270 of logic at the destination STA for transmitting (unicast) the RREP to the STA from which it has received the RREQ. Processing commences at block 272, and at block 274 this destination STA prepares the RREP frame and initializes the values, including setting the RREP.Metric field. At block 278 a check is made on the forwarding table to determine if it has forwarded the same RREP message with a smaller metric to the neighbor STA. If at block 278 it is determined that the forward table already contains the entry for RREQ.TA with a smaller metric, then execution follows the Yes path end execution at block 280. Otherwise, if it has not forwarded the same RREP message with a smaller metric, then block 278 is reached at which the destination STA sends the RREP message to the STA from which it has received the RREQ frame, and the process ends 280.

4.6.4. RREP Receiver STA Behavior 4.6.4.1. RREP Receiver STA Logic Flow 1

Figure 24A:
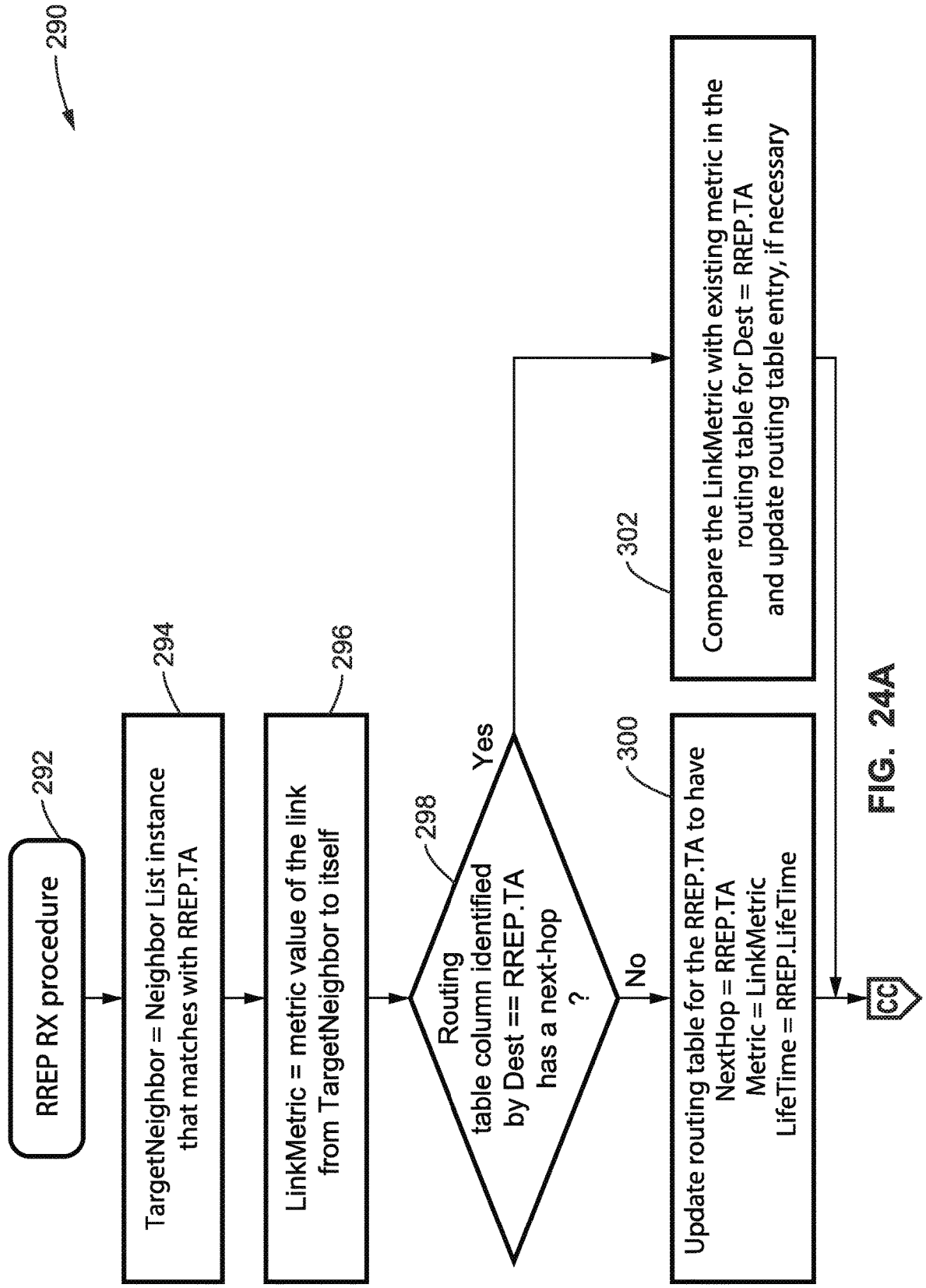
FIG. 24A through FIG. 24C is a flow diagram of logic for receiving Route Reply (RREP) frames according to an embodiment of the present disclosure.
Figure 24B:
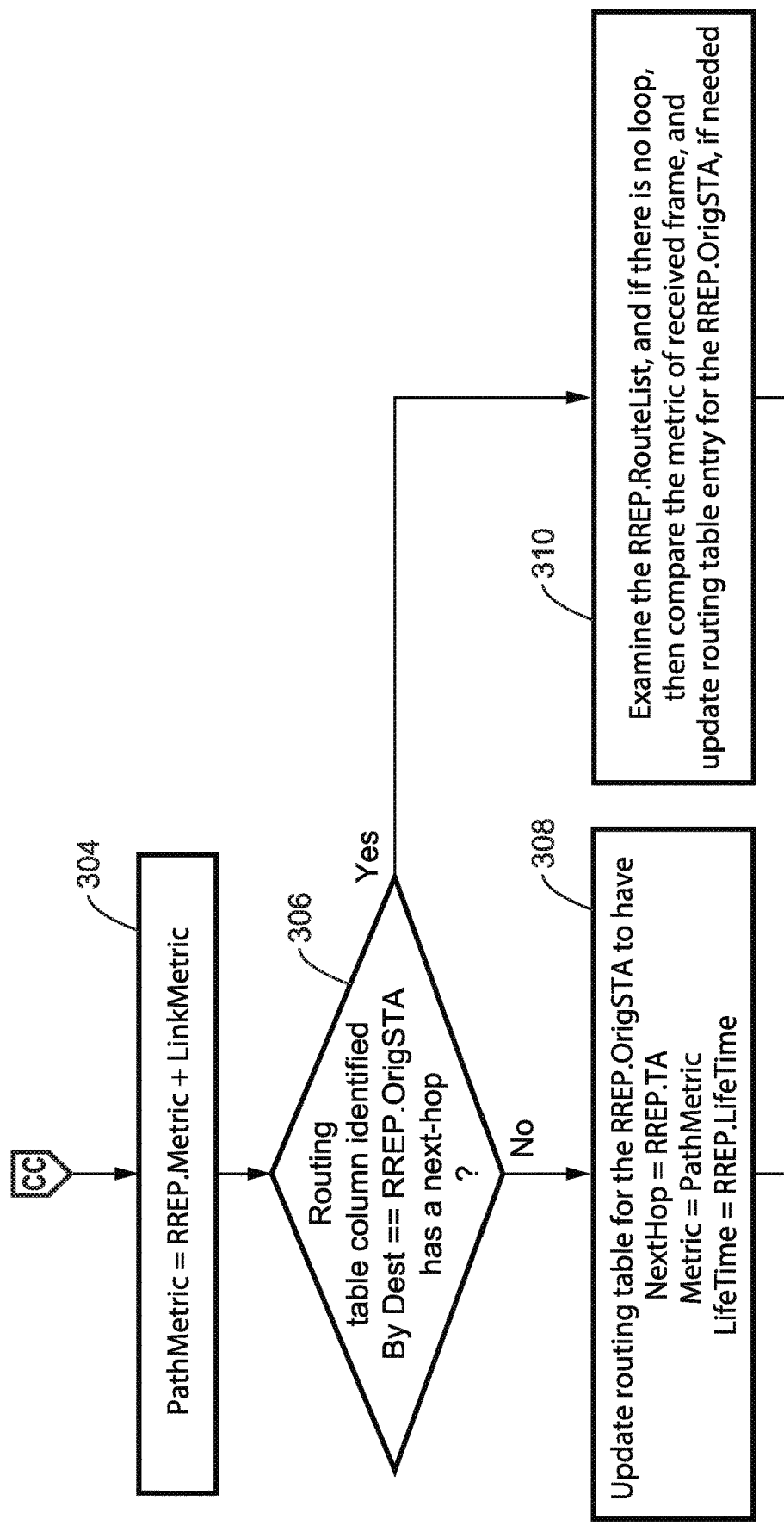
Figure 24C:
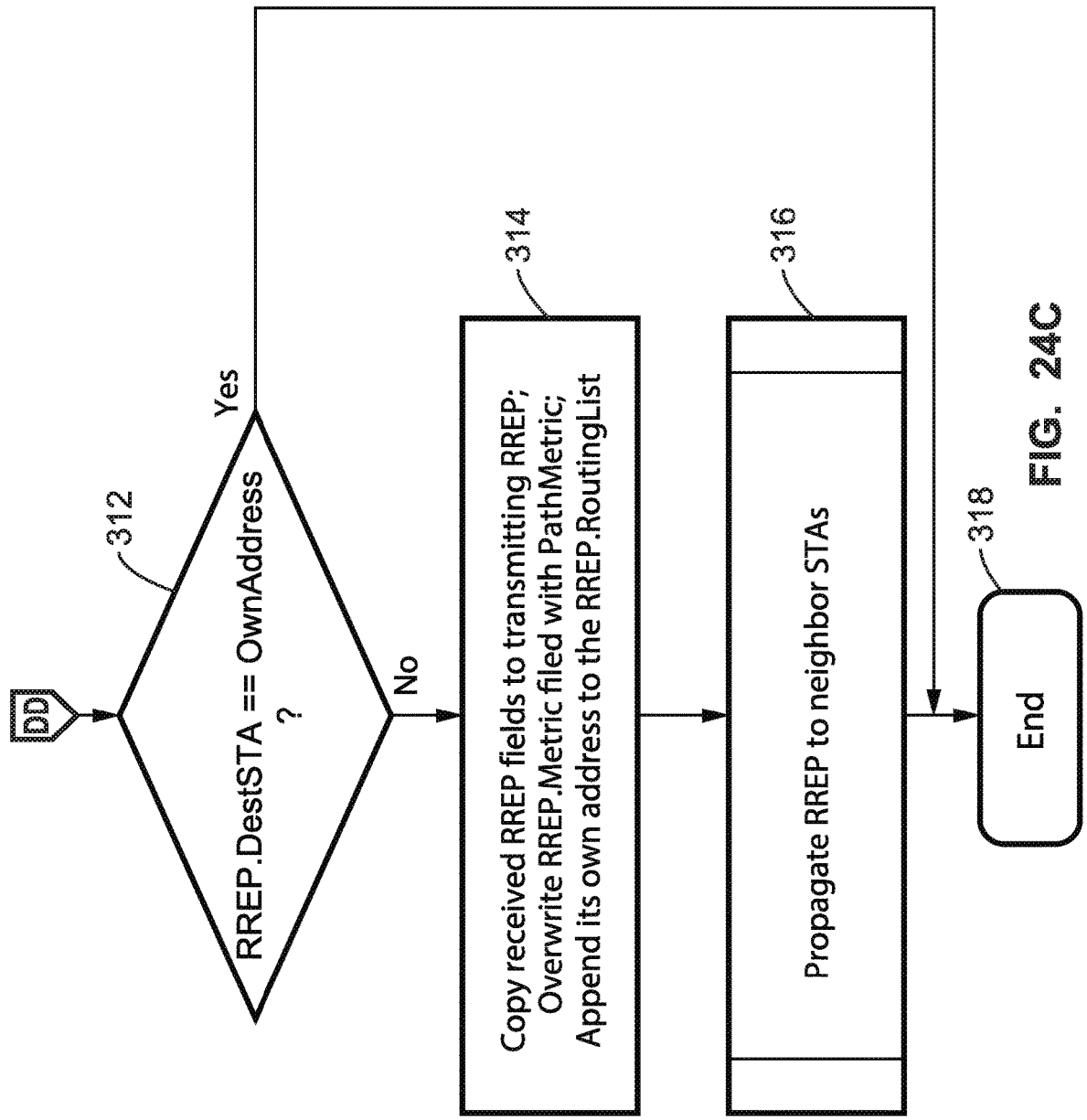

FIG. 24A through FIG. 24C illustrates an example embodiment 290 for receiving an RREP frame at a STA. Execution commences at block 292, and at block 294 the TargetNeighbor is set to the neighbor list instance that matches with the RREP.TA, after which the link metric is estimated 296 between the STA itself and RREP.TA (TargetNeighbor). At block 298 the routing table is checked to determine if the destination being RREP.TA has a next hop. If there is a next hop, then the yes path is taken to block 302 at which time the routing table for Destination of RREP.TA is updated as necessary based on comparing the link metric with the existing metric, and execution reaches block 304 in FIG. 24B. Otherwise, if there is no next hop found at block 298, then execution reaches block 300, at which time the routing table is updated for the RREP.TA with NextHop set to RREP.TA, Metric set to LinkMetric, and the LifeTime set to RREP.LifeTime, and execution then reaches block 304 in FIG. 24B, at which time the path metric is updated to the sum of the RREP.Metric and the LinkMetric.

At block 306 a check is made if the routing table column for the destination (RREP.OrigSTA) has a next hop. If there is a next hop, then the Yes path is taken to block 310 at which time the routing table for RREP.OrigSTA is updated as necessary if there is no loop, based on examining RREP.RouteList and comparing the metric of the received frame, after which execution reaches block 312 in FIG. 24C. Otherwise, if there is no next hop found at block 306, then execution reaches block 308, at which time the routing table is updated for the RREP.OrigSTA with NextHop set to RREP.TA, Metric set to PathMetric, and the LifeTime set to RREP.LifeTime, with execution then reaching block 312 in FIG. 24C.

At block 312 a check is made if the RREP destination (RREP.DestSTA) is its own STA address. If the destination is its own address, then execution follows the Yes path to end 318 the process. Otherwise, if the this STA is not the destination, then block 314 is reached which copies the received RREP fields to the RREP frame being built for transmission, and overwrites the RREP.Metric with PathMetric and appends its own address in the RREP.RoutingList, then at block 316 is propagates the RREP before ending 318.

Thus, it is seen in the above process steps that if the RREP has not been received before (e.g., through a different path), then the STA updates the routing table for the primary next-hop entry. If the RREP is detected to be a duplicate, then the STA extracts the metric value from the RREP message and updates the routing table based on the metric of the duplicate RREP message and metrics already recorded in the routing table. If the DestSTA address in the RREP frame is the same as the address of the STA itself, it means that the RREP frame has returned back to the STA that requested RREQ in the first place. If the DestSTA is not equal to the address of the STA itself, it means that the STA is an intermediate node and it needs to propagate the RREP to its neighbor STAs, according to the following logic.

4.6.4.2. RREP Receiver STA Logic Flow 2

Figure 25:
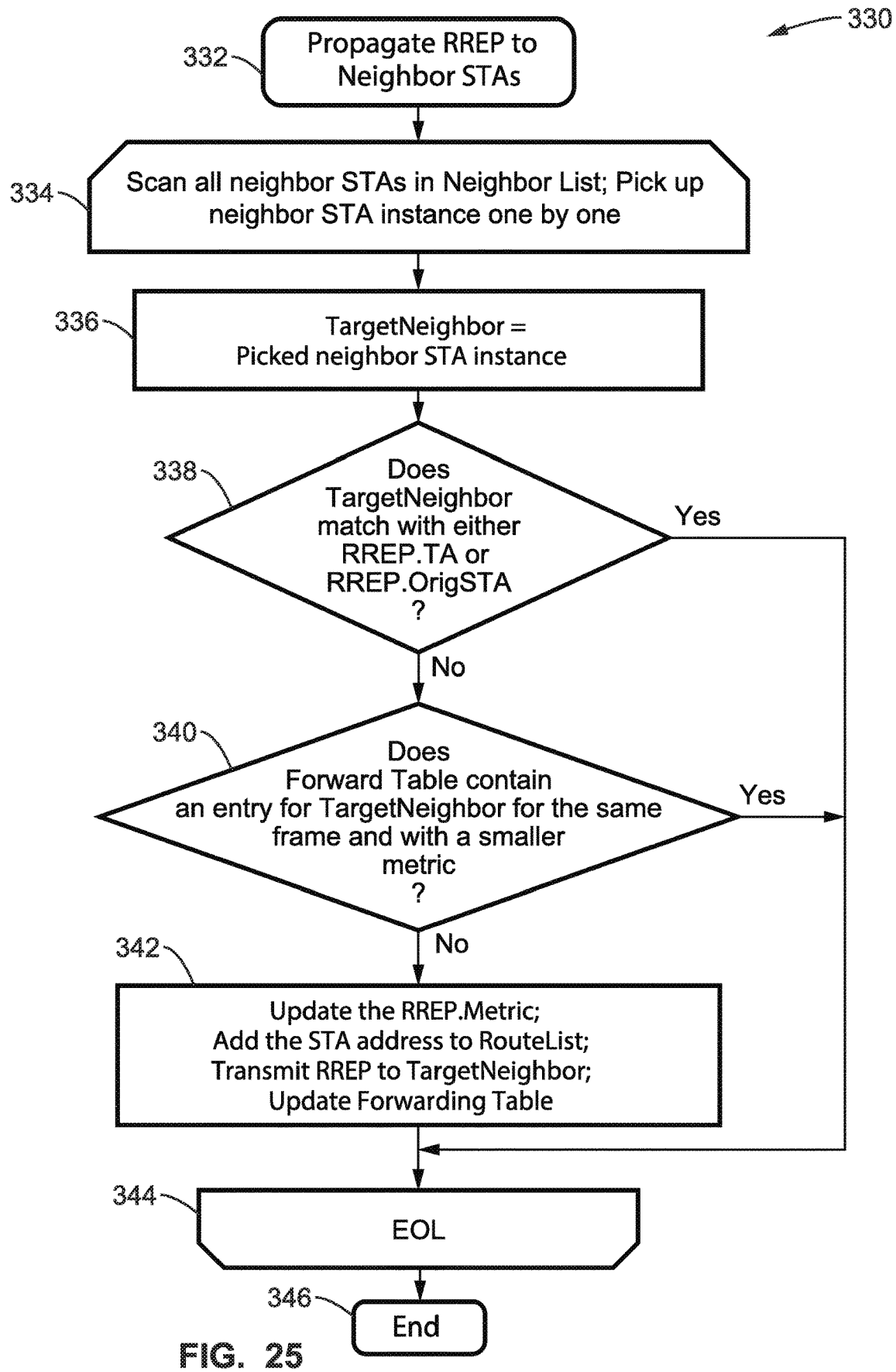
FIG. 25 is a flow diagram of propagating Route Reply (RREP) messages to neighbor stations (STAs) according to an embodiment of the present disclosure.

FIG. 25 illustrates an example embodiment 330 of a STA propagating the RREP messages to one-hop neighbor STAs. The process commences at block 332 and scans its neighbor list at block 334. The STA maintains a Neighbor List containing the list of its one-hop neighbor STAs. The STA receiving the RREP frame to propagate to its neighbor STAs, scans 334 for STAs in its neighbor list one by one. The STA loops through the STAs listed in its neighbor list, and selects (picks) the STAs one by one. In block 336, TargetNeighbor is set to the selected (picked) neighbor instance. It should be noted that instances of TargetNeighbor are selected one by one, as the STA goes through the list selecting neighbor STAs one by one. There are check in block 338 and 340, that some of the neighbor STAs won't receive the RREP message as a result of this propagation logic, thus resulting in a selective propagation. The STA forwards the RREP to its neighbor STA if and only if none of a number of conditions are found to be true.

A check 338 is made if the TargetNeighbor STA is the transmitter of the RREP or is the OrigSTA of the RREP. If either of these conditions is true, then execution branches to block 344. Otherwise, if these conditions are not met, then block 340 is reached which checks if the forwarding table contains an entry for the TargetNeighbor having the same frame and with a smaller metric (better path). If the check is true, then execution moves to block 344. Otherwise, if the conditions are not met, then block 342 is reached and the RREP.Metric is updated, the STA address is added to the RouteList, the RREP is transmitted to the TargetNeighbor, and the forwarding table is updated with end of the looping construct 344 being reached.

4.7. Proactive Link Maintenance

Figure 26:
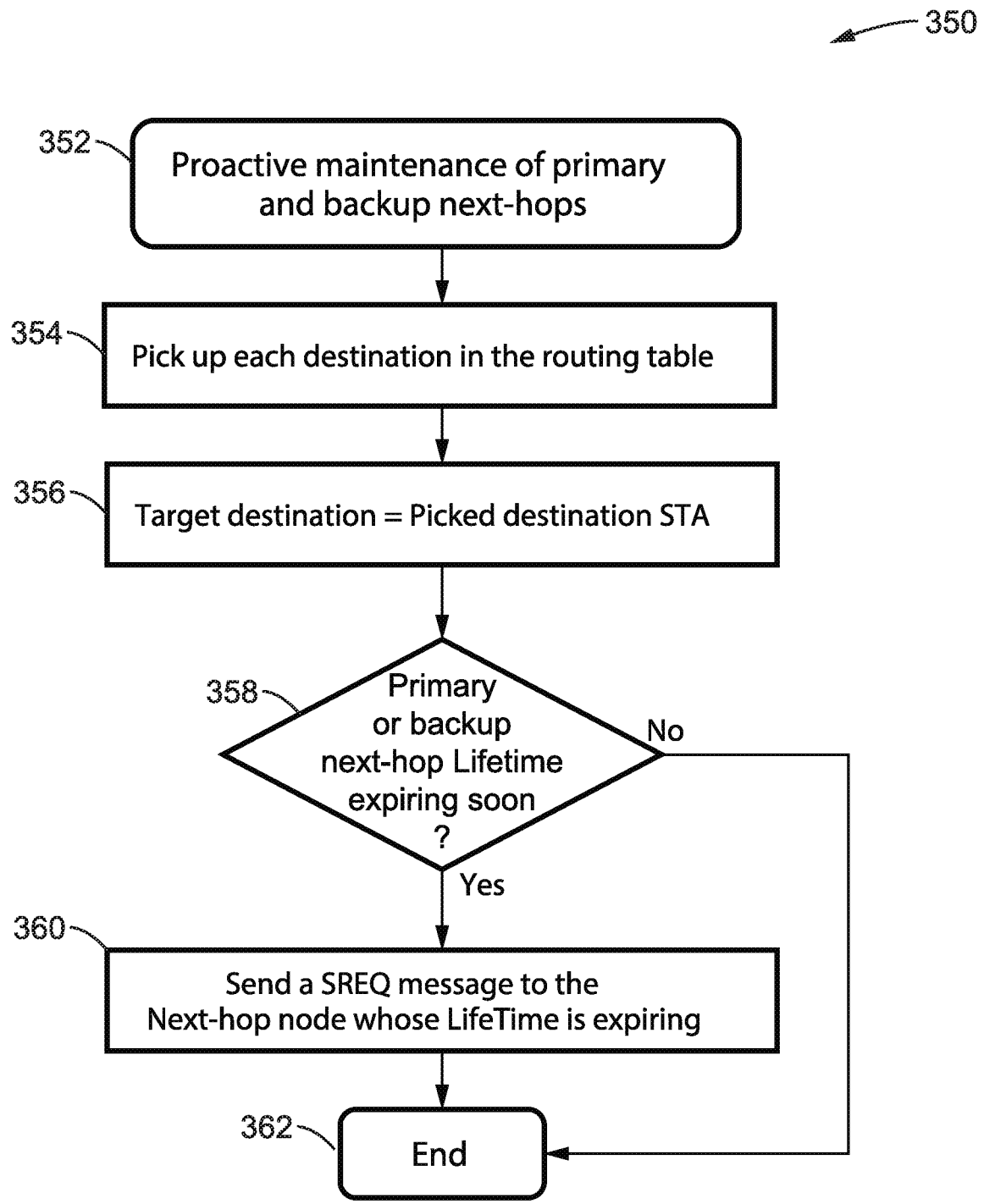
FIG. 26 is a flow diagram of logic for sending Status Request (SREQ) messages according to an embodiment of the present disclosure.

FIG. 26 illustrates an example embodiment 350 for the STA sending an SREQ to its neighbor STA. The first step 352 in the process is performing proactive maintenance of primary and backup next-hops. Each STA needs to make sure that its routing table entries remain valid and that the next-hop and backup next-hop nodes are reachable for each entry. There is a Lifetime for each entry (primary and backup next-hop) in the routing table, and each STA is responsible for keeping the entries up to date and valid. Toward this end, each STA periodically sends a Status Request (SREQ) message to the STAs that are listed as next-hop, either primary or backup. Specifically, this is performed by the STA picking up (selecting) 354 each destination in the routing table, followed by setting 356 the target destination to be the selected destination STA, followed by a check 358 to determine if the primary or backup next-hop lifetime is expiring soon. If the lifetimes are not expiring soon, then execution ends 362. Otherwise, if the check at 358 indicates lifetimes are expiring soon, then block 360 is executed which sends an SREQ message to the next-hop STA whose LifeTime is expiring, and the process ends 362.

Figure 27:
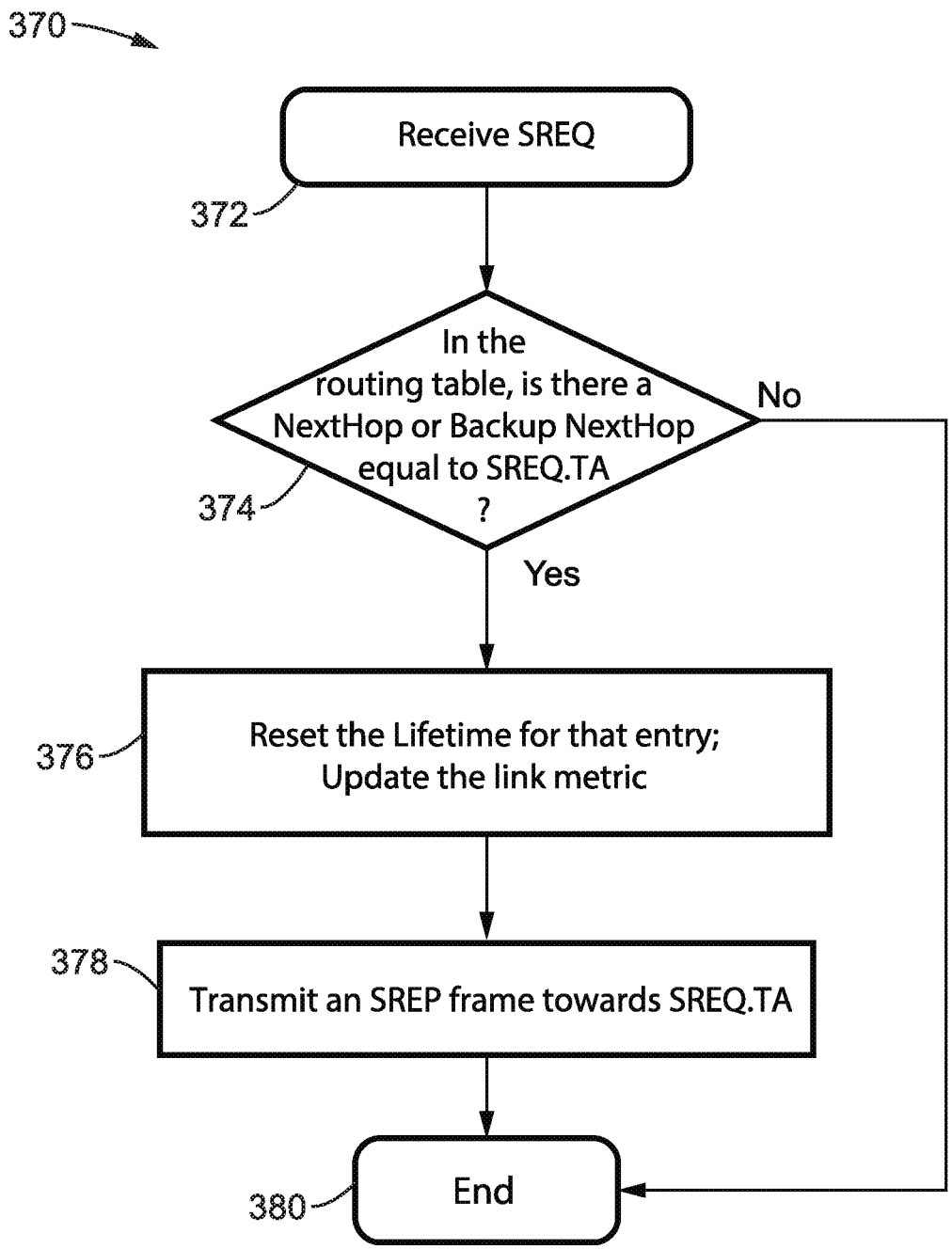
FIG. 27 is a flow diagram of logic for receiving and processing Status Request (SREQ) messages according to an embodiment of the present disclosure.

FIG. 27 illustrates an example embodiment 370 for the STA receiving and processing an SREQ from its neighbor STA. The first step 372 is receiving and processing the SREQ message. A check is made 374 to determine if there is a NextHop or Backup NextHop, which is equal to SREQ.TA. If there is no NextHop in either case then the process ends 378. Otherwise, the NextHop or Backup NextHop is processed at block 376 which resets the Lifetime for that entry and the link metric is updated. A Status Reply (SREP) message is then transmitted 378 towards the SREQ.TA to end the process 380. It is seen that when the SREQ is received, then the receiver STA resets its Lifetime for the transmitter address of SREQ. When the SREQ is received, the receiver STA sends a status reply (SREP) message back to the SREQ.TA.

Figure 28:
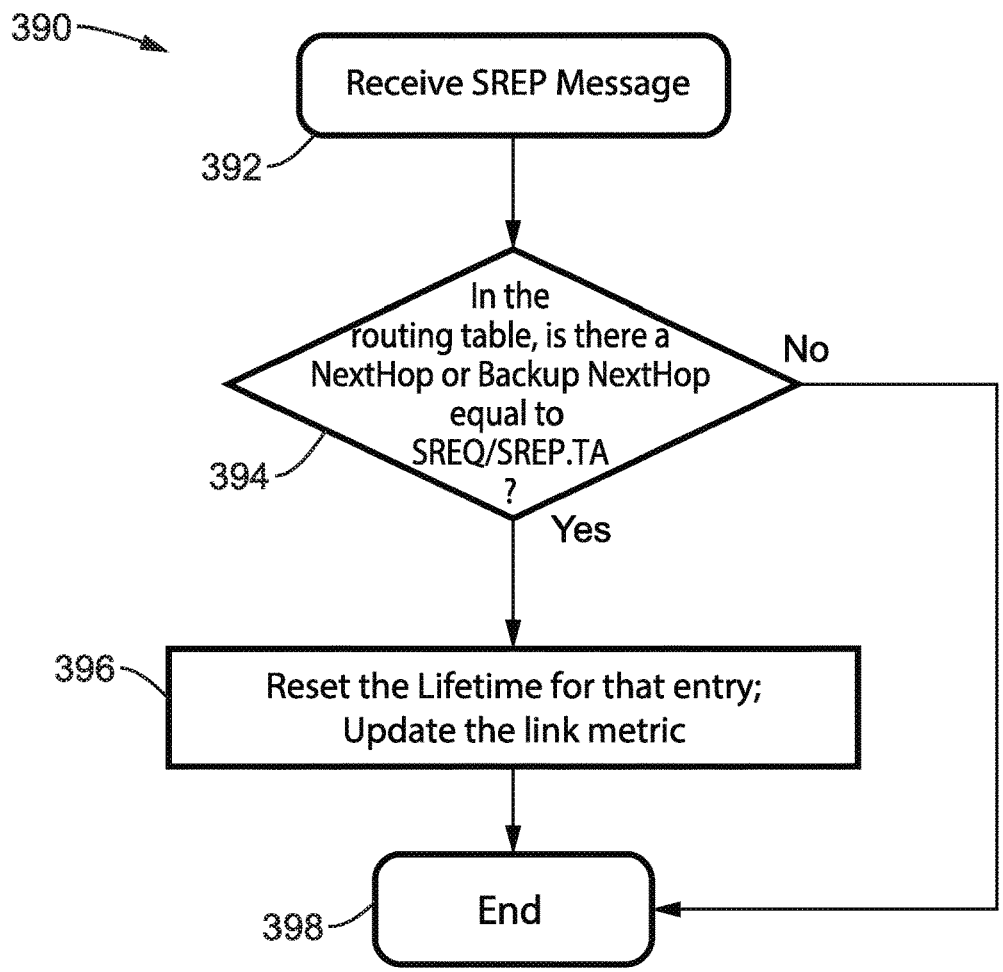
FIG. 28 is a flow diagram of logic for receiving and processing Status Reply (SREP) messages according to an embodiment of the present disclosure.

FIG. 28 illustrates an example embodiment 390 for the STA receiving and processing a status reply (SREP). Upon receiving 392 the SREP, a check is made 394 for a next hop or backup next hop. If there is no NextHop in either case then the process ends 398. Otherwise, the NextHop or Backup NextHop is processed at block 396 in which the SREQ.TA (original transmitter of the SREQ) updates its Lifetime corresponding to SREQ.RA. In addition to resetting the lifetime timer, the STA updates its estimate of the link metric, before ending 398 the process.

4.8. Example 1: Populating Routing and Forwarding Tables

4.8.1. Topology.

Figure 29:
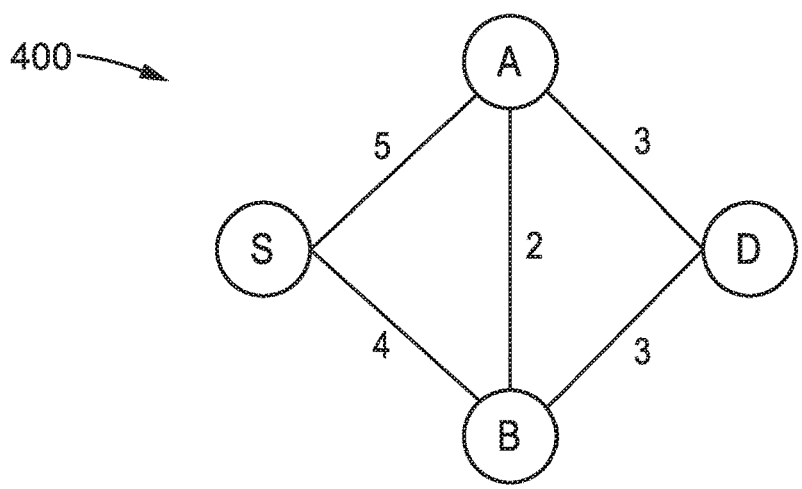
FIG. 29 is a network topology diagram of example stations and their interconnection metrics as utilized according to an embodiment of the present disclosure.

FIG. 29 illustrates an example network topology 400 having four stations Source (S), Destination (D) and intermediate (relay) stations A and B. In this scenario, each of the bidirectional links utilized is labeled with the metric of that link, depicted metric 5 between STA S and STA A, metric 4 between STA S and STA B, metric 3 between STA A and STA D, metric 3 between STA B and STA D, and metric 2 between STA A and STA B. In this particular example, and for the sake of simplicity, we assume link reciprocity meaning that the cost of A to B is the same as the cost of B to A. However, the disclosed protocol in this report is generally applicable and thus can also be utilized with networks having non-reciprocal links.

4.8.2. Message Sequence Chart

Figure 30A:
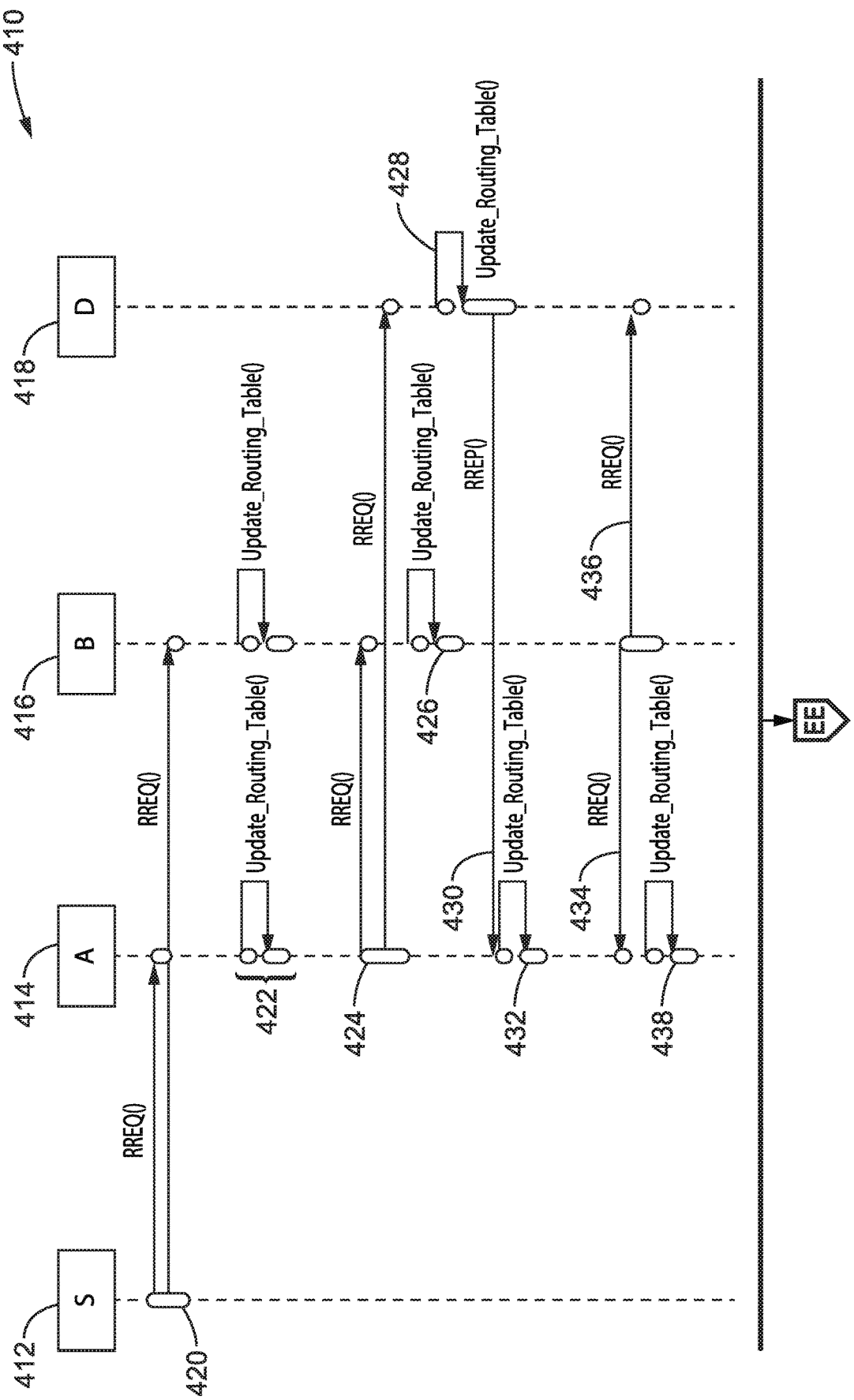
FIG. 30A and FIG. 30B is an example message sequence diagram of routing and control messages between stations according to an embodiment of the present disclosure.
Figure 30B:
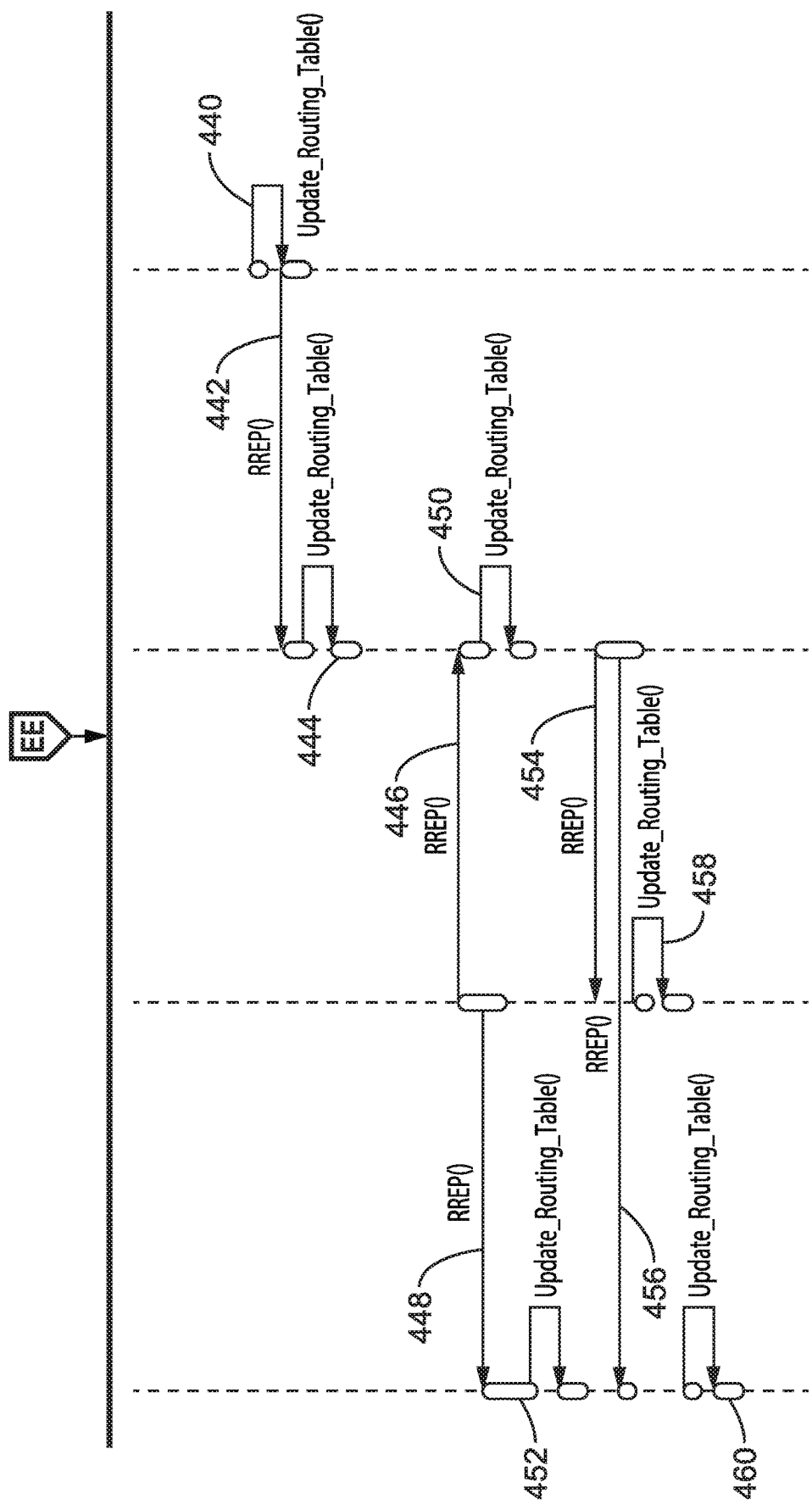

FIG. 30A and FIG. 30B is a message sequence diagram of the interactions between stations shown in the example topology of FIG. 29. In FIG. 30A, the chart depicts STA S 412, STA A 414, STA B 416, STA D 418 across the top, with the specific communications shown in the underlying rows depicts as between specific stations. In this scenario, STA S starts sending 420 RREQ messages, and its neighbor STAs (STA A and STA B) receive the RREQ. In row 422 it is seen that both STA A and STA B update their routine tables. At 424 STA A passes on the RREQ to its neighbors STA B and STA D, which each update their routing tables 426, 428, respectively.

Once STA D receives a RREQ, it sends out an RREP message 430 to STA A from which the RREQ was received from, this station accordingly updates 432 its routing table. STA B then passes a copy of the RREQ 434, 436 to its neighbors, in response to which STA A and STA D update their routing tables 438, 440 (as seen in FIG. 30B), respectively. Similarly, STA D responds to the RREQ from STA B, by sending out an RREP message 442 to STA B causing STA B to update 444 its routing table.

Having received the RREP, STA A passes along (floods) 446, 448 the RREP to STA S and STA B, which update their routing tables 452, 450. Similarly, having received the RREP, STA B passes along (floods) 454, 456 the RREP to STA A and STA S, which update their routing tables 458, 460. Thus, it is seen above that the RREQ floods from source (STA S) to destination (STA D), and RREPs are flooded from the destination (STA D) back to the source (STA S), while the intermediate nodes populate their routing tables.

4.8.3. Routing Table and Forwarding Table of STA S @ Step 0

The initial routing table is seen in Table 3 for an example with traffic destination as STA D, with the NextHop for Destination D as being not applicable (N/A). Table 4 depicts the initial forwarding table, according to which STA S generates the RREQ message with seqNum 0, and TA equal to S and reception address (RA) as A and B. Then the RREQ is forwarded to A and B and the forwarding table is updated.

4.8.4. Routing Table and Forwarding Table of STA A @ Step 1

STA A receives RREQ from S, estimates the link metric and updates the routing table to that seen in Table 5. STA A forwards the RREQ to Node B and to Node D. STA A does not forward to STA S, since S is the same neighbor from which STA A received the RREQ message from. STA A updates the Forwarding Table as seen in Table 6.

4.8.5. Routing Table and Forwarding Table of STA B @ Step 1

STA B receives RREQ from STA S, it estimates the link metric, and updates the routing table as seen in Table 7. STA B forwards the RREQ to STA A and to STA D. Node B does not forward the message to STA S since that is the same neighbor from which the message was received from. STA B updates its forwarding table as seen in Table 8.

4.8.6. Routing Table and Forwarding Table of STA A @ Step 2

STA A receives the RREQ from STA B and updates the routing table as follows. Since the RREQ.TA is STA B and RREQ.OrigSTA is STA S, STA A recognizes that STA B can reach to STA S, either directly or through other nodes. It also compares the metric of this RREQ and previous RREQ that was received from S directly and determines the primary and backup next-hop. STA A then updates the routing as seen in Table 9, that now includes backup next-hop to STA S. STA A does not forward the received RREQ to STA S because the OrigSTA and RREQ.RA will be equal. As the received RREQ from STA B has Metric equal to 6, while STA A has sent the same message to D with Metric equal to 5. Therefore, A does not forward the RREQ received from STA B to STA D. As a result the forwarding table of STA A appears as seen in Table 10.

4.8.7. Routing Table and Forwarding Table of STA B @ Step 2

STA B receives the RREQ from STA A and updates the routing table as seen in Table 11 in which STA A is the backup next hop to reach to STA S. STA B does not forward the received RREQ to S because RREQ.OrigSTA and RREQ.RA will be equal in that case. When STA B receives RREQ from STA A, it checks its forwarding table and sees that it has already forwarded an RREQ message to STA D with metric 4. Thus, it does not forward the received RREQ message to STA D with metric of 7 (STA S to STA A (5)+STA A to STA B (2)). Table 12 depicts the resultant forwarding table at STA B.

4.8.8. Routing Table and Forwarding Table of STA D @ Step 2

STA D receives an RREQ from STA A with Metric equal to 8. STA D receives an RREQ from STA B with Metric equal to 7. STA D compares the Metric values and determines the primary and backup next hop for STA S. Thus, it updates the routing table as seen in Table 13. STA D generates the RREP message in response to each RREQ that it has received. Therefore, STA D forwards an RREP message to STA A and STA B, and updates its forwarding table as seen in Table 14.

4.8.9. Routing Table and Forwarding Table of STA A @ Step 3

STA A receives the RREP message from STA D, estimates the link metric and updates its routing table as seen in Table 15. STA A forwards the RREP message to STA S and STA B, and updates its forwarding table as seen in Table 16.

4.8.10. Routing Table and Forwarding Table of STA B @ Step 3

STA B receives an RREP message from STA D, then estimates the link metric and updates its routing table as seen in Table 17. STA B forwards the RREP message to STA S and to STA A, and updates its forwarding table as seen in Table 18.

4.8.11. Routing Table and Forwarding Table of STA A @ Step 4

STA A receives an RREP message from STA B, and it estimates the metric and updates its routing table, as seen in Table 19, in which STA B now has a backup next-hop to reach to STA D. STA A does not forward the RREP to STA D because OrigSTA would be the same as RA in that case. STA A does not forward the RREP to STA B because it has just received an RREP from STA B.

STA A does not forward this RREP to STA S because the forwarding table at STA A is shown in Table 20, and it has already forwarded an RREP message to STA S with a Metric equal to 3. Therefore, STA A does not forward an RREP with metric equal to 5.

4.8.12. Routing Table and Forwarding Table of STA B @ Step 4

STA B receives an RREP message from STA A. STA B updates the routing table as seen in Table 21 in which STA A is the backup next-hop to reach to STA D. STA B does not forward the RREP message to STA D because OrigSTA will be the same as RA in that case. STA B does not forward the RREP to STA A because it has just received the RREP from STA A. STA B does not forward this RREP message to STA S because of it has already forwarded an RREP message to STA S with a Metric equal to 3, therefore, it does not forward an RREP with metric equal to 5.

4.8.13. Routing Table and Forwarding Table of STA S @ Step 4

STA S receives an RREP message from STA A with a Metric value of 8 and from STA B with a Metric of 7. STA S updates its routing table as seen in Table 23, in which STA B is the primary next-hop to reach to STA D; while STA A is the backup next-hop to reach to STA D. The forwarding table is seen in Table 24.

4.9. Example 2: Link Blockage

Figure 31:
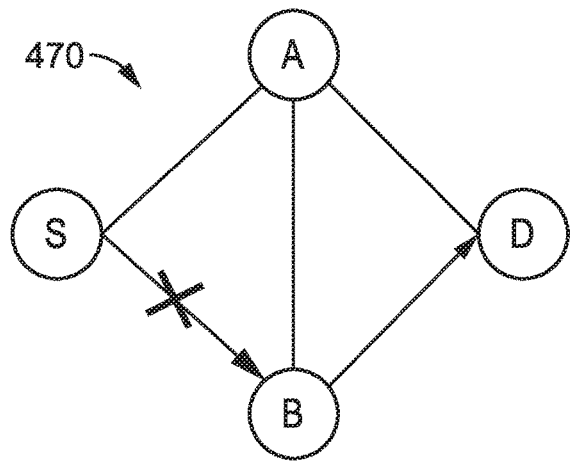
FIG. 31 through FIG. 34 are network topology diagrams showing link blockage examples as addressed according to an embodiment of the present disclosure.

FIG. 31 illustrates an example embodiment 470 showing a broken link between stations as a cross sign. This example scenario examines the situation of a link blockage. It is assumed that link from STA S to STA B is blocked (e.g., by human body) in the middle of data transmissions.

Under this scenario, the routing table at STA S includes STA A as the backup next-hop to reach to STA D as shown in Table 25. Therefore, based on the routing table, STA S switches to its backup next-hop (STA A) that is ready to be deployed.

From the routing table at STA A, it is seen that STA A has knowledge of reaching STA D. Moreover, through proactive link maintenance, STA A has up-to-date information in its routing table as seen in Table 26.

Accordingly, STA A has STA D as the primary next-hop in order to reach to STA D, and therefore STA A sends data traffic to STA D.

Figure 32:
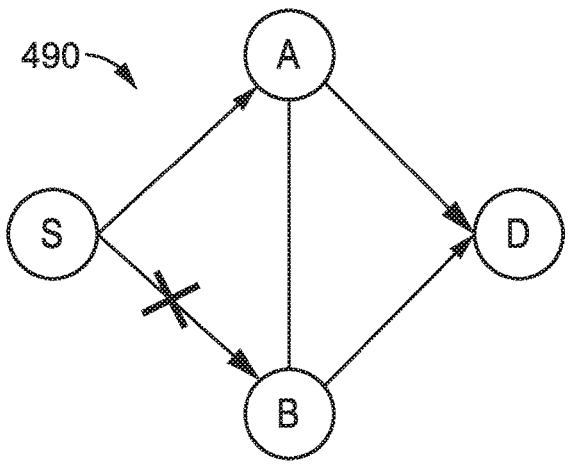

FIG. 32 illustrates an example embodiment 490 showing an updated network topology in which STA S has switched to its backup next-hop (STA A) to reach to destination STA D.

4.10. Example 3: Link B to D is Blocked

Figure 33:
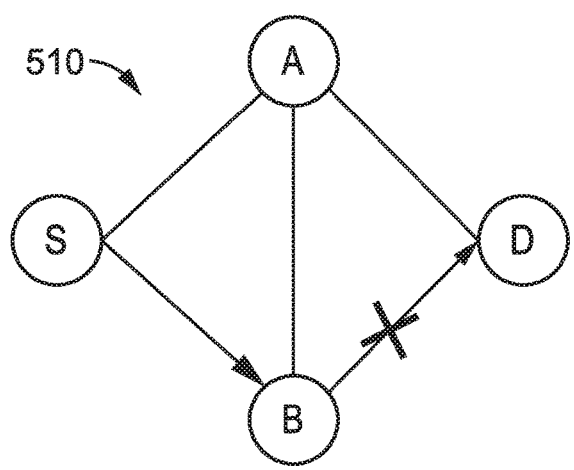

FIG. 33 illustrates an example embodiment 510 of a scenario in which the link from STA B (relay node) to STA D (destination station) is blocked. In this case, the routing table at STA B is as seen in Table 27 showing the routing table at STA B in which there is a backup next-hop to reach STA D. From Table 27 it is seen that STA B has STA A as the backup next-hop in order to reach destination STA D. Therefore, upon detection of a broken link, STA B routes the traffic to STA A. From the routing table at STA A, it is seen that STA A has knowledge of reaching to STA D. Moreover, through proactive link maintenance, STA A has up-to-date information in its routing table is seen in Table 28. As a result, STA A has STA D as the primary next-hop in order to reach STA D, and therefore STA A sends data traffic to STA D.

Figure 34:
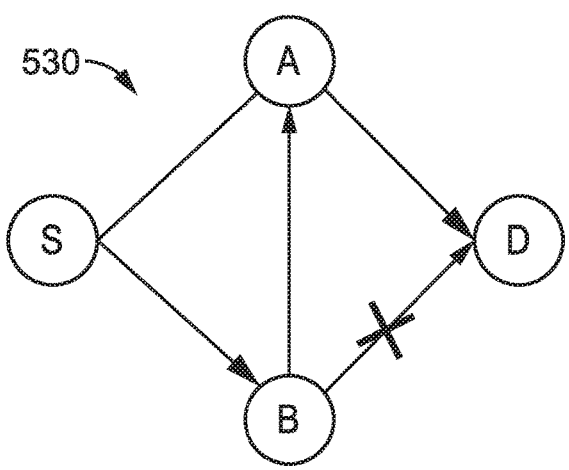

FIG. 34 illustrates an example embodiment 530 of the updated network topology, showing an updated routing path in which STA B has switched to its backup next-hop (STA A) in order to reach STA D.

From the topology, it is seen that the back-up route is not the optimal end-to-end route (three hops instead of 2 hops from STA S to STA A to STA D); which is acceptable because during the next round of route discovery process initiated by STA S, the optimal end-to-end route will be utilized.

It will be noted that the transition to the back-up route according to the disclosure should be seamless, because during active data traffic transmissions is a very poor time for searching out optimal end-to-end paths. Rather, the disclosure obtains a routing solution with an alternative route that would work, and then in the next round of route discovery, the optimal alternative route would be deployed.

5. Summary of Disclosure Elements

The following summary discloses certain important elements of the instant disclosure, however the summary is not to be construed as describing the only important elements of the disclosure.

A. Wireless STAs communicating over directional transmission/reception, such as mmW communication, where the originating STA needs to transmit data traffic to the destination STA, potentially through multiple hops performs the following: (a) when setting a route that enables traffic traveling over multiple hops, traffic originating STA sends out route discovery message to its neighbor STAs; (b) upon reception of the route discovery message: (b)(i) STA calculates link metric with the neighbor STA that transmitted the route discovery message, (b)(ii) STA propagates the route discovery message to its neighbor STAs if the STA is not the destination of the traffic, (c) upon reception of the route discovery message by the destination STA, it sends out route reply messages to the STA from which the route discovery message was received, (d) STAs that receive route reply message propagate the route reply message to its neighbor STAs until it is received by the originating STA.

B. Wireless STAs of element A, when receiving route discovery messages, the STAs update their routing table with an entry to the transmitting STA and the estimated link metric C. Wireless STAs of element A, when receiving several route discovery messages through different paths, pick top two messages and set the sender of those messages as the primary next-hop and backup next-hop to reach to the originating STA of the route discovery message.

D. Wireless STAs of element A, when receiving several route discovery messages through different paths, pick the route discovery message with the smallest (i.e., best) metric and forwards to its neighbor STAs, excluding the transmitter of the route discovery messages.

E. Wireless STAs of element A, when forwarding a route discovery message to its neighbors, record the information of the message in the forwarding table.

F. Wireless STAs of element A, transmits status request messages to the primary and backup next-hop STAs of each entry in their routing table to make sure the entries in the routing table are up to date and the next-hop STAs are reachable.

G. Wireless STAs of element A, when receiving a route discovery message with destination address to be the address of the STA itself, send a route reply to the STA from which the route discovery message was received.

H. Wireless STAs of element A, when receiving route reply messages, update their routing table with an entry to the transmitting STA and the estimated link metric.

I. Wireless STAs of element A, when receiving several route reply messages through different paths, pick top two messages and set the sender of those two messages as the primary next-hop and backup next-hop to reach to the originating STA of the route reply message.

J. Wireless STAs of element A, when receiving several route reply messages through different paths, pick the route reply message with the smallest metric and forwards to its neighbor STAs, excluding the transmitter of route reply messages.

K. Wireless STAs of element A, when forwarding a route reply message to its neighbors, record the information of the message in the forwarding table.

6. General Scope of Embodiments

The enhancements described in the presented technology can be readily implemented within the protocols of various wireless communication stations. It should also be appreciated that wireless communication stations are preferably implemented to include one or more computer processor devices (e.g., CPU, microprocessor, microcontroller, computer enabled ASIC, etc.) and associated memory storing instructions (e.g., RAM, DRAM, NVRAM, FLASH, computer readable media, etc.) whereby programming (instructions) stored in the memory are executed on the processor to perform the steps of the various process methods described herein.

The computer and memory devices were not depicted in every one of the diagrams for the sake of simplicity of illustration, as one of ordinary skill in the art recognizes the use of computer devices for carrying out steps involved with controlling a wireless communication station. The presented technology is non-limiting with regard to memory and computer-readable media, insofar as these are non-transitory, and thus not constituting a transitory electronic signal.

Embodiments of the present technology may be described herein with reference to flowchart illustrations of methods and systems according to embodiments of the technology, and/or procedures, algorithms, steps, operations, formulae, or other computational depictions, which may also be implemented as computer program products. In this regard, each block or step of a flowchart, and combinations of blocks (and/or steps) in a flowchart, as well as any procedure, algorithm, step, operation, formula, or computational depiction can be implemented by various means, such as hardware, firmware, and/or software including one or more computer program instructions embodied in computer-readable program code. As will be appreciated, any such computer program instructions may be executed by one or more computer processors, including without limitation a general purpose computer or special purpose computer, or other programmable processing apparatus to produce a machine, such that the computer program instructions which execute on the computer processor(s) or other programmable processing apparatus create means for implementing the function(s) specified.

Accordingly, blocks of the flowcharts, and procedures, algorithms, steps, operations, formulae, or computational depictions described herein support combinations of means for performing the specified function(s), combinations of steps for performing the specified function(s), and computer program instructions, such as embodied in computer-readable program code logic means, for performing the specified function(s). It will also be understood that each block of the flowchart illustrations, as well as any procedures, algorithms, steps, operations, formulae, or computational depictions and combinations thereof described herein, can be implemented by special purpose hardware-based computer systems which perform the specified function(s) or step(s), or combinations of special purpose hardware and computer-readable program code.

Furthermore, these computer program instructions, such as embodied in computer-readable program code, may also be stored in one or more computer-readable memory or memory devices that can direct a computer processor or other programmable processing apparatus to function in a particular manner, such that the instructions stored in the computer-readable memory or memory devices produce an article of manufacture including instruction means which implement the function specified in the block(s) of the flowchart(s). The computer program instructions may also be executed by a computer processor or other programmable processing apparatus to cause a series of operational steps to be performed on the computer processor or other programmable processing apparatus to produce a computer-implemented process such that the instructions which execute on the computer processor or other programmable processing apparatus provide steps for implementing the functions specified in the block(s) of the flowchart(s), procedure (s) algorithm(s), step(s), operation(s), formula(e), or computational depiction(s).

It will further be appreciated that the terms "programming" or "program executable" as used herein refer to one or more instructions that can be executed by one or more computer processors to perform one or more functions as described herein. The instructions can be embodied in software, in firmware, or in a combination of software and firmware. The instructions can be stored local to the device in non-transitory media, or can be stored remotely such as on a server, or all or a portion of the instructions can be stored locally and remotely. Instructions stored remotely can be downloaded (pushed) to the device by user initiation, or automatically based on one or more factors.

It will further be appreciated that as used herein, that the terms processor, hardware processor, computer processor, central processing unit (CPU), and computer are used synonymously to denote a device capable of executing the instructions and communicating with input/output interfaces and/or peripheral devices, and that the terms processor, hardware processor, computer processor, CPU, and computer are intended to encompass single or multiple devices, single core and multicore devices, and variations thereof.

From the description herein, it will be appreciated that the present disclosure encompasses multiple embodiments which include, but are not limited to, the following:

1. An apparatus for wireless communication in a network, the apparatus comprising: (a) a wireless communication circuit configured for wirelessly communicating directly, or through one or more hops, with at least one other wireless communication circuit; (b) a processor coupled to said wireless communication circuit within a station configured for operating on a wireless network; (c) a non-transitory memory storing instructions executable by the processor; and (d) wherein said instructions, when executed by the processor, perform steps comprising: (d)(i) transmitting route discovery messages to neighboring stations when establishing a route that enables communication over multiple hops; (d)(ii) calculating a link metric indicating the desirability of a link in a routing path, upon receipt of a route discovery message, with a neighbor station that transmitted the route discovery message; (d)(iii) responding to reception of a route discovery message by either: (A) propagating the route discovery message to its neighbor stations if the station receiving the route discovery message is not the destination of the wireless communication; or (B) sending out a route reply message to a station from which the route discovery message was received, if the station receiving the route discovery message is the destination of the wireless communication; and (d)(iv) propagating route reply messages to neighbor stations until one or more route reply messages, through one or more paths, is received by an originating station as the station which originally transmitted the route discovery messages.

2. An apparatus for wireless communication in a network, the apparatus comprising: (a) a wireless communication circuit configured for wirelessly communicating directly, or through one or more hops, with at least one other wireless communication circuit; (b) a processor coupled to said wireless communication circuit within a station configured for operating on a wireless network; (c) non-transitory memory storing instructions executable by the processor; and (d) wherein said instructions, when executed by the processor, perform steps comprising: (d)(i) transmitting route discovery messages to neighboring stations when establishing a route that enables communication over multiple hops; (d)(ii) calculating a link metric indicating the desirability of a link in a routing path, upon receipt of a route discovery message, with a neighbor station that transmitted the route discovery message; (d)(iii) responding to reception of a route discovery message by either: (A) propagating the route discovery message to its neighbor stations if the station receiving the route discovery message is not the destination of the wireless communication; or (B) sending out a route reply message to a station from which the route discovery message was received, if the station receiving the route discovery message is the destination of the wireless communication; and (d)(iv) updating a routing table by a station receiving a route discovery message, said routing table updated with an entry for a station that transmitted the route discovery message, and updating the routing table with an estimated link metric; (d)(v) propagating route reply messages to neighbor stations until one or more route reply messages, through one or more paths, is received by an originating station as the station which originally transmitted the route discovery messages; and (d)(vi) selecting a primary and at least one backup route for reaching the originating station in response to receiving several route discovery messages through different paths at a destination station.

3. A method of performing wireless communication in a network, comprising: (a) transmitting route discovery messages from a wireless communications circuit to neighboring stations when establishing a route that enables communication over multiple hops; (b) calculating a link metric indicating the desirability of a link in a routing path, upon receipt of a route discovery message, with a neighbor station that transmitted the route discovery message; (c) responding to reception of a route discovery message by either: (c)(A) propagating the route discovery message to its neighbor stations if the station receiving the route discovery message is not the destination of the wireless communication; or (c)(B) sending out a route reply message to a station from which the route discovery message was received, if the station receiving the route discovery message is the destination of the wireless communication; and (d) propagating route reply messages to neighbor stations until one or more route reply messages, through one or more paths, is received by an originating station as the station which originally transmitted the route discovery messages.

4. The apparatus or method of any preceding embodiment, wherein said link metric indicating the desirability of a link in a routing path comprises routing path length, or routing path quality, or a combination of routing path length and routing path quality.

5. The apparatus or method of any preceding embodiment, wherein said instructions when executed by the processor further performs updating a routing table by a station receiving a route discovery message, said routing table updated with an entry for a station that transmitted the route discovery message, and updating the routing table with an estimated link metric.

6. The apparatus or method of any preceding embodiment, wherein said instructions when executed by the processor further performs selecting a primary and at least one backup route for reaching the originating station in response to receiving several route discovery messages through different paths at a destination station.

7. The apparatus or method of any preceding embodiment, wherein said instructions when executed by the processor further performs responding to receiving several route discovery messages through different paths by selecting a route discovery message based on link metric and forwarding this route discovery message with an updated link metric to neighbor stations except the station which transmitted the route discovery messages which was received.

8. The apparatus or method of any preceding embodiment, wherein said instructions when executed by the processor further performs recording information from a received route discovery message into a forwarding table when forwarding a route discovery message to its neighbors.

9. The apparatus or method of any preceding embodiment, wherein said instructions when executed by the processor further performs maintaining routing paths by transmitting status request messages to primary and backup next-hop stations of each entry in their routing table to assure that entries in the routing table are up to date and the next-hop stations are reachable.

10. The apparatus or method of any preceding embodiment, wherein said instructions when executed by the processor further performs (a) determining that a destination address of a received route discovery message is the station itself, and transmitting a route reply message back to the station from which the route discovery message was received.

11. The apparatus or method of any preceding embodiment, wherein said instructions when executed by the processor further performs responding to a received route reply message by updating the routing table with a station entry and estimated link metric for the station which transmitted the route reply message.

12. The apparatus or method of any preceding embodiment, wherein said instructions when executed by the processor further performs responding to receiving several route reply messages through several different paths by selecting the most desirable routes as a primary next-hop path and at least one backup next-hop path and setting the sender of those messages as the primary next-hop and the at least one backup next-hop to reach to an originating station of the route reply message.

13. The apparatus or method of any preceding embodiment, wherein said instructions when executed by the processor further performs responding to receiving several route reply messages through different paths by selecting the route reply messages with the most desired link metric and forward the route reply message to its neighboring stations, exclusive of the station which transmitted the route reply messages.

14. The apparatus or method of any preceding embodiment, wherein said instructions when executed by the processor further performs record information from received route reply messages in the forwarding table, when forwarding a route reply message to neighboring stations.

15. The apparatus or method of any preceding embodiment, wherein said wireless communication circuit comprises a millimeter wave station configured for directional communications.

16. The apparatus or method of any preceding embodiment, wherein said wireless communication circuit is configured for operating in both mesh networks and non-mesh networks.

17. The apparatus or method of any preceding embodiment, wherein said wireless communication circuit is configured with directional communications on a first band and for quasi-Omni directional communications on a second band.

As used herein, the singular terms "a," "an," and "the" may include plural referents unless the context clearly dictates otherwise. Reference to an object in the singular is not intended to mean "one and only one" unless explicitly so stated, but rather "one or more."

As used herein, the term "set" refers to a collection of one or more objects. Thus, for example, a set of objects can include a single object or multiple objects.

As used herein, the terms "substantially" and "about" are used to describe and account for small variations. When used in conjunction with an event or circumstance, the terms can refer to instances in which the event or circumstance occurs precisely as well as instances in which the event or circumstance occurs to a close approximation. When used in conjunction with a numerical value, the terms can refer to a range of variation of less than or equal to ±10% of that numerical value, such as less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%. For example, "substantially" aligned can refer to a range of angular variation of less than or equal to ±10°, such as less than or equal to ±5°, less than or equal to ±4°, less than or equal to ±3°, less than or equal to ±2°, less than or equal to ±1°, less than or equal to ±0.5°, less than or equal to ±0.1°, or less than or equal to ±0.05°.

Additionally, amounts, ratios, and other numerical values may sometimes be presented herein in a range format. It is to be understood that such range format is used for convenience and brevity and should be understood flexibly to include numerical values explicitly specified as limits of a range, but also to include all individual numerical values or sub-ranges encompassed within that range as if each numerical value and sub-range is explicitly specified. For example, a ratio in the range of about 1 to about 200 should be understood to include the explicitly recited limits of about 1 and about 200, but also to include individual ratios such as about 2, about 3, and about 4, and sub-ranges such as about 10 to about 50, about 20 to about 100, and so forth.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

TABLE 1

Routing Table at STA S

| Destination | A | B | D |
|---|---|---|---|
| NextHop | A | B | B |
| Metric | 5 | 4 | 7 |
| Lifetime | 999 | 999 | 999 |
| Backup NextHop | N/A | N/A | A |
| Backup Metric | N/A | N/A | 8 |
| Backup Lifetime | N/A | N/A | 999 |

TABLE 2

Forwarding Table at STA S

| Neighbor | A | B |
|---|---|---|
| Origin STA | S | S |
| Seq. Number | 0 | 0 |
| Type | RREQ | RREQ |
| Metric | N/A | N/A |

TABLE 3

Routing Table in an Initial State

| Destination | A | B | D |
|---|---|---|---|
| NextHop | N/A | N/A | N/A |
| Metric | N/A | N/A | N/A |
| Lifetime | N/A | N/A | N/A |
| Backup NextHop | N/A | N/A | N/A |
| Backup Metric | N/A | N/A | N/A |
| Backup Lifetime | N/A | N/A | N/A |

TABLE 4

Forwarding Table at STA S

| Next Hop | A | B |
|---|---|---|
| Originating STA | S | S |
| Seq. Number | 0 | 0 |
| Type | RREQ | RREQ |
| Metric | N/A | N/A |

TABLE 5

Routing Table at STA A

| Destination | S | B | D |
|---|---|---|---|
| NextHop | S | N/A | N/A |
| Metric | 5 | N/A | N/A |
| Lifetime | 999 | N/A | N/A |
| Backup NextHop | N/A | N/A | N/A |
| Backup Metric | N/A | N/A | N/A |
| Backup Lifetime | N/A | N/A | N/A |

TABLE 6

Forwarding Table at STA A

| Next Hop | B | D |
|---|---|---|
| Origin STA | S | S |
| Seq. Number | 0 | 0 |
| Type | RREQ | RREQ |
| Metric | 5 | 5 |

TABLE 7

Routing Table at STA A

| Destination | S | A | D |
|---|---|---|---|
| NextHop | S | N/A | N/A |
| Metric | 4 | N/A | N/A |
| Lifetime | 999 | N/A | N/A |
| Backup NextHop | N/A | N/A | N/A |
| Backup Metric | N/A | N/A | N/A |
| Backup Lifetime | N/A | N/A | N/A |

TABLE 8

Forwarding Table at STA B

| Next Hop | A | D |
|---|---|---|
| Origin STA | S | S |
| Seq. Number | 0 | 0 |
| Type | RREQ | RREQ |
| Metric | 4 | 4 |

TABLE 9

Routing Table at STA A

| Destination | S | B | D |
|---|---|---|---|
| NextHop | S | B | N/A |
| Metric | 5 | 2 | N/A |
| Lifetime | 999 | 999 | N/A |
| Backup NextHop | B | N/A | N/A |
| Backup Metric | 6 | N/A | N/A |
| Backup Lifetime | 999 | N/A | N/A |

TABLE 10

Forwarding Table at STA A

| Next Hop | B | D |
|---|---|---|
| Originating STA | S | S |
| Sequence Number | 0 | 0 |
| Type | RREQ | RREQ |
| Metric | 5 | 5 |

TABLE 11

Routing Table at STA B

| Destination | S | A | D |
|---|---|---|---|
| NextHop | S | A | N/A |
| Metric | 4 | 2 | N/A |
| Lifetime | 999 | 999 | N/A |
| Backup NextHop | A | N/A | N/A |

TABLE 11-continued

Routing Table at STA B

| Destination | S | A | D |
|---|---|---|---|
| Backup Metric | 7 | N/A | N/A |
| Backup Lifetime | 999 | N/A | N/A |

TABLE 12

Forwarding Table at STA B

| Next Hop | A | D |
|---|---|---|
| Originating STA | S | S |
| Sequence Number | 0 | 0 |
| Type | RREQ | RREQ |
| Metric | 4 | 4 |

TABLE 13

Routing Table at STA D

| Destination | S | A | B |
|---|---|---|---|
| NextHop | B | A | B |
| Metric | 7 | 3 | 3 |
| Lifetime | 999 | 999 | 999 |
| Backup NextHop | A | N/A | N/A |
| Backup Metric | 8 | N/A | N/A |
| Backup Lifetime | 999 | N/A | N/A |

TABLE 14

Forwarding Table at STA D

| Next Hop | A | B |
|---|---|---|
| Originating STA | D | D |
| Sequence Number | 0 | 0 |
| Type | RREP | RREP |
| Metric | N/A | N/A |

TABLE 15

Routing Table at STA A

| Destination | S | B | D |
|---|---|---|---|
| NextHop | S | B | D |
| Metric | 5 | 2 | 3 |
| Lifetime | 999 | 999 | 999 |
| Backup NextHop | B | N/A | N/A |
| Backup Metric | 6 | N/A | N/A |
| Backup Lifetime | 999 | N/A | N/A |

TABLE 16

Forwarding Table at STA A

| Next Hop | B | D | S | B |
|---|---|---|---|---|
| Originating STA | S | S | D | D |
| Sequence Number | 0 | 0 | 0 | 0 |
| Type | RREQ | RREQ | RREP | RREP |
| Metric | 5 | 5 | 3 | 3 |

TABLE 17

Routing Table at STA B

| Destination | S | A | D |
|---|---|---|---|
| NextHop | S | A | D |
| Metric | 4 | 2 | 3 |
| Lifetime | 999 | 999 | 999 |
| Backup NextHop | A | N/A | N/A |
| Backup Metric | 7 | N/A | N/A |
| Backup Lifetime | 999 | N/A | N/A |

TABLE 18

Forwarding Table at STA A

| Next Hop | A | D | S | A |
|---|---|---|---|---|
| Originating STA | S | S | D | D |
| Sequence Number | 0 | 0 | 0 | 0 |
| Type | RREQ | RREQ | RREP | RREP |
| Metric | 4 | 4 | 3 | 3 |

TABLE 19

Routing Table at STA A

| Destination | S | B | D |
|---|---|---|---|
| NextHop | S | B | D |
| Metric | 5 | 2 | 3 |
| Lifetime | 999 | 999 | 999 |
| Backup NextHop | B | N/A | B |
| Backup Metric | 6 | N/A | 5 |
| Backup Lifetime | 999 | N/A | 999 |

TABLE 20

Forwarding Table at STA A

| Next Hop | B | D | S | B |
|---|---|---|---|---|
| Originating STA | S | S | D | D |
| Sequence Number | 0 | 0 | 0 | 0 |
| Type | RREQ | RREQ | RREP | RREP |
| Metric | 5 | 5 | 3 | 3 |

TABLE 21

Routing Table at STA B

| Destination | S | A | D |
|---|---|---|---|
| NextHop | S | A | D |
| Metric | 4 | 2 | 3 |
| Lifetime | 999 | 999 | 999 |
| Backup NextHop | A | N/A | A |
| Backup Metric | 7 | N/A | 5 |
| Backup Lifetime | 999 | N/A | 999 |

TABLE 22

Forwarding Table at STA B

| Next Hop | A | D | S | A |
|---|---|---|---|---|
| Originating STA | S | S | D | D |
| Sequence Number | 0 | 0 | 0 | 0 |

TABLE 22-continued

Forwarding Table at STA B

| Next Hop | A | D | S | A |
|---|---|---|---|---|
| Type | RREQ | RREQ | RREP | RREP |
| Metric | 4 | 4 | 3 | 3 |

TABLE 23

Routing Table at STA S

| Destination | A | B | D |
|---|---|---|---|
| NextHop | A | B | B |
| Metric | 5 | 4 | 7 |
| Lifetime | 999 | 999 | 999 |
| Backup NextHop | N/A | N/A | A |
| Backup Metric | N/A | N/A | 8 |
| Backup Lifetime | N/A | N/A | 999 |

TABLE 24

Forwarding Table at STA S

| Next Hop | A | B |
|---|---|---|
| Originating STA | S | S |
| Sequence Number | 0 | 0 |
| Type | RREQ | RREQ |
| Metric | N/A | N/A |

TABLE 25

Routing Table at STA S

| Destination | A | B | D |
|---|---|---|---|
| NextHop | A | B | B |
| Metric | 5 | 4 | 7 |
| Lifetime | 999 | 999 | 999 |
| Backup NextHop | N/A | N/A | A |
| Backup Metric | N/A | N/A | 8 |
| Backup Lifetime | N/A | N/A | 999 |

TABLE 26

Routing Table at STA A

| Destination | S | B | D |
|---|---|---|---|
| NextHop | S | B | D |
| Metric | 5 | 2 | 3 |
| Lifetime | 999 | 999 | 999 |
| Backup NextHop | B | N/A | B |
| Backup Metric | 6 | N/A | 5 |
| Backup Lifetime | 999 | N/A | 999 |

TABLE 27

Routing Table at STA B with Backup Next Hop to Reach STA D

| Destination | S | A | D |
|---|---|---|---|
| NextHop | S | A | D |
| Metric | 4 | 2 | 3 |
| Lifetime | 999 | 999 | 999 |
| Backup NextHop | A | N/A | A |

TABLE 27-continued

Routing Table at STA B with Backup Next Hop to Reach STA D

| Destination | S | A | D |
|---|---|---|---|
| Backup Metric | 7 | N/A | 5 |
| Backup Lifetime | 999 | N/A | 999 |

TABLE 28

Routing Table at STA A

| Destination | S | B | D |
|---|---|---|---|
| Next Hop | S | B | D |
| Metric | 5 | 2 | 3 |
| Lifetime | 999 | 999 | 999 |
| Backup NextHop | B | N/A | B |
| Backup Metric | 6 | N/A | 5 |
| Backup Lifetime | 999 | N/A | 999 |

What is claimed is:

1. An apparatus for wireless communication in a network, the apparatus comprising:
   (a) a wireless communication circuit configured for wirelessly communicating directly, or through one or more hops, with at least one other wireless communication circuit;
   (b) a processor coupled to said wireless communication circuit within a station configured for operating on a wireless network;
   (c) a non-transitory memory storing instructions executable by the processor; and
   (d) wherein said instructions, when executed by the processor, perform steps comprising:
      (i) transmitting route discovery messages to neighboring stations when establishing a route that enables communication over multiple hops;
      (ii) calculating a link metric indicating the desirability of a link in a routing path, upon receipt of a route discovery message, with a neighbor station that transmitted the route discovery message;
      (iii) responding to reception of a route discovery message by either: (A) propagating the route discovery message to its neighbor stations if the station receiving the route discovery message is not the destination of the wireless communication; or (B) sending out a route reply message to a station from which the route discovery message was received, if the station receiving the route discovery message is the destination of the wireless communication;
      (iv) responding to receiving several route reply messages through several different paths by either: (A) selecting the most desirable routes as a primary next-hop path and at least one backup next-hop path and setting the sender of those messages as the primary next-hop and the at least one backup next-hop to reach to an originating station of the route reply message, or (B) selecting the route reply message with the most desired link metric and forwarding the route reply message to its neighboring stations, exclusive of the station which transmitted the route reply messages; and
      (v) propagating route reply messages to neighbor stations until one or more route reply messages, through one or more paths, is received by an originating station as the station which originally transmitted the route discovery messages.

2. The apparatus of claim 1, wherein said link metric indicating the desirability of a link in a routing path comprises routing path length, or routing path quality, or a combination of routing path length and routing path quality.

3. The apparatus of claim 1, wherein said instructions when executed by the processor further performs updating a routing table by a station receiving a route discovery message, said routing table updated with an entry for a station that transmitted the route discovery message, and updating the routing table with an estimated link metric.

4. The apparatus of claim 1, wherein said instructions when executed by the processor further performs selecting a primary and at least one backup route for reaching the originating station in response to receiving several route discovery messages through different paths at a destination station.

5. The apparatus of claim 1, wherein said instructions when executed by the processor further performs responding to receiving several route discovery messages through different paths by selecting a route discovery message based on link metric and forwarding this route discovery message with an updated link metric to neighbor stations except the station which transmitted the route discovery messages which was received.

6. The apparatus of claim 1, wherein said instructions when executed by the processor further performs recording information from a received route discovery message into a forwarding table when forwarding a route discovery message to its neighbors.

7. The apparatus of claim 1, wherein said instructions when executed by the processor further performs maintaining routing paths by transmitting status request messages to primary and backup next-hop stations of each entry in their routing table to assure that entries in the routing table are up to date and the next-hop stations are reachable.

8. The apparatus of claim 1, wherein said instructions when executed by the processor further performs (a) determining that a destination address of a received route discovery message is the station itself, and transmitting a route reply message back to the station from which the route discovery message was received.

9. The apparatus of claim 1, wherein said instructions when executed by the processor further performs responding to a received route reply message by updating the routing table with a station entry and estimated link metric for the station which transmitted the route reply message.

10. The apparatus of claim 1, wherein said instructions when executed by the processor further performs record information from received route reply messages in the forwarding table, when forwarding a route reply message to neighboring stations.

11. The apparatus of claim 1, wherein said wireless communication circuit comprises a millimeter wave station configured for directional communications.

12. The apparatus of claim 1, wherein said wireless communication circuit is configured for operating in both mesh networks and non-mesh networks.

13. The apparatus of claim 1, wherein said wireless communication circuit is configured with directional communications on a first band and for quasi-Omni directional communications on a second band.

14. An apparatus for wireless communication in a network, the apparatus comprising:
(a) a wireless communication circuit configured for wirelessly communicating directly, or through one or more hops, with at least one other wireless communication circuit;
(b) a processor coupled to said wireless communication circuit within a station configured for operating on a wireless network;
(c) a non-transitory memory storing instructions executable by the processor; and
(d) wherein said instructions, when executed by the processor, perform steps comprising:
(i) transmitting route discovery messages to neighboring stations when establishing a route that enables communication over multiple hops;
(ii) calculating a link metric indicating the desirability of a link in a routing path, upon receipt of a route discovery message, with a neighbor station that transmitted the route discovery message;
(iii) responding to reception of a route discovery message by either: (A) propagating the route discovery message to its neighbor stations if the station receiving the route discovery message is not the destination of the wireless communication; or (B) sending out a route reply message to a station from which the route discovery message was received, if the station receiving the route discovery message is the destination of the wireless communication;
(iv) responding to receiving several route reply messages through several different paths by either: (A) selecting the most desirable routes as a primary next-hop path and at least one backup next-hop path and setting the sender of those messages as the primary next-hop and the at least one backup next-hop to reach to an originating station of the route reply message, or (B) selecting the route reply message with the most desired link metric and forwarding the route reply message to its neighboring stations, exclusive of the station which transmitted the route reply messages; and
(v) updating a routing table by a station receiving a route discovery message, said routing table updated with an entry for a station that transmitted the route discovery message, and updating the routing table with an estimated link metric;
(vi) propagating route reply messages to neighbor stations until one or more route reply messages, through one or more paths, is received by an originating station as the station which originally transmitted the route discovery messages; and
(vii) selecting a primary and at least one backup route for reaching the originating station in response to receiving several route discovery messages through different paths at a destination station.

15. The apparatus of claim 14, wherein said instructions when executed by the processor further performs responding to receiving several route discovery messages through different paths by selecting a route discovery message based on link metric and forwarding this route discovery message with an updated link metric to neighbor stations except the station which transmitted the route discovery messages which was received.

16. The apparatus of claim 14, wherein said instructions when executed by the processor further performs recording information from a received route discovery message into a forwarding table when forwarding a route discovery message to its neighbors.

17. The apparatus of claim 14, wherein said instructions when executed by the processor further performs maintaining routing paths by transmitting status request messages to primary and backup next-hop stations of each entry in their routing table to assure that entries in the routing table are up to date and the next-hop stations are reachable.

18. The apparatus of claim 14, wherein said instructions when executed by the processor further performs (a) determining that a destination address of a received route discovery message is the station itself, and transmitting a route reply message back to the station from which the route discovery message was received.

19. The apparatus of claim 14, wherein said instructions when executed by the processor further performs responding to a received route reply message by updating the routing table with a station entry and estimated link metric for the station which transmitted the route reply message.

20. The apparatus of claim 14, wherein said instructions when executed by the processor further performs record information from received route reply messages in the forwarding table, when forwarding a route reply message to neighboring stations.

21. A method of performing wireless communication in a network, comprising:
  (a) transmitting route discovery messages from a wireless communications circuit to neighboring stations when establishing a route that enables communication over multiple hops;
  (b) calculating a link metric indicating the desirability of a link in a routing path, upon receipt of a route discovery message, with a neighbor station that transmitted the route discovery message;
  (c) responding to reception of a route discovery message by either: (A) propagating the route discovery message to its neighbor stations if the station receiving the route discovery message is not the destination of the wireless communication; or (B) sending out a route reply message to a station from which the route discovery message was received, if the station receiving the route discovery message is the destination of the wireless communication;
  (d) responding to receiving several route reply messages through several different paths by either: (i) selecting the most desirable routes as a primary next-hop path and at least one backup next-hop path and setting the sender of those messages as the primary next-hop and the at least one backup next-hop to reach to an originating station of the route reply message, or (ii) selecting the route reply message with the most desired link metric and forwarding the route reply message to its neighboring stations, exclusive of the station which transmitted the route reply messages; and
  (e) propagating route reply messages to neighbor stations until one or more route reply messages, through one or more paths, is received by an originating station as the station which originally transmitted the route discovery messages.

* * * * *